US012668010B2

(12) United States Patent
Maehara et al.

(10) Patent No.: US 12,668,010 B2
(45) **Date of Patent: \*Jun. 30, 2026**

(54) METHOD FOR PRODUCING POLYMERIC MOLDED PRODUCT

(71) Applicants:Mitsubishi Gas Chemical Company, Inc., Chiyoda-ku (JP); The University of Tokyo, Tokyo (JP)

(72) Inventors: Akira Maehara, Niigata (JP); Tadahisa Iwata, Tokyo (JP); Taku Omura, Tokyo (JP); Taizo Kabe, Sayo-gun (JP)

(73) Assignees: Mitsubishi Gas Chemical Company, Inc., Chiyoda-ku (JP); The University of Tokyo, Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 18/000,453

(22) PCT Filed: Jun. 2, 2021

(86) PCT No.: PCT/JP2021/020956
§ 371 (c)(1),
(2) Date: Dec. 1, 2022

(87) PCT Pub. No.: WO2021/246433
PCT Pub. Date: Dec. 9, 2021

(65) Prior Publication Data
US 2023/0219273 A1      Jul. 13, 2023

(30) Foreign Application Priority Data

Jun. 2, 2020      (JP) ................................. 2020-096144

(51) Int. Cl.
B29C 48/00          (2019.01)
B29C 48/78          (2019.01)
(Continued)

(52) U.S. Cl.
CPC ............ B29C 48/022 (2019.02); B29C 48/78 (2019.02); B29C 48/92 (2019.02);
(Continued)

(58) Field of Classification Search
None
See application file for complete search history.

(56) References Cited

U.S. PATENT DOCUMENTS 4,997,909 A      3/1991   Doi
5,061,743 A  *  10/1991   Herring ..................... C08K 3/22
                                                            524/436

(Continued)

FOREIGN PATENT DOCUMENTS

CN        102108563 A      6/2011
EP        0 400 855 A1    12/1990

(Continued)

OTHER PUBLICATIONS

Machine translation of JP-2010241075-A, Oct. 28, 2010 (Year: 2010).*

(Continued)

*Primary Examiner* — Benjamin A Schiffman
(74) *Attorney, Agent, or Firm* — Oblon, McClelland, Maier & Neustadt, L.L.P.

(57)      ABSTRACT

An object of the present invention is to provide a method for producing a polymeric molded product, which does not undergo a considerable molecular weight reduction during melt-molding, even in a polymer may easily lose its molecular weight when it is in a melted state. The present invention provides a method for producing a polymeric molded product, which comprises melt-molding a polymer comprising lamellar crystals that are different in lamella thickness, in a
(Continued)

temperature range where some of the lamellar crystals undergo melting and flowing, and the other balance lamellar crystals remain unmelted.

6 Claims, 27 Drawing Sheets

(51) Int. Cl.
| | |
|---|---|
| *B29C 48/92* | (2019.01) |
| *B29K 67/00* | (2006.01) |
| *D01F 6/84* | (2006.01) |

(52) U.S. Cl.
CPC .... *B29K 2067/04* (2013.01); *B29K 2995/006* (2013.01); *D01F 6/84* (2013.01)

(56) References Cited

U.S. PATENT DOCUMENTS

| | | | | |
|---|---|---|---|---|
| 5,516,565 | A | 5/1996 | Matsumoto | |
| 5,693,389 | A * | 12/1997 | Liggat | C08L 67/04 |
| | | | | 525/450 |
| 5,917,002 | A | 6/1999 | Doi et al. | |
| 5,948,462 | A * | 9/1999 | Atsuta | A23L 13/65 |
| | | | | 426/585 |
| 6,005,066 | A * | 12/1999 | Lehrle | C08K 5/175 |
| | | | | 435/71.1 |
| 6,111,006 | A | 8/2000 | Waddington | |
| 6,136,905 | A * | 10/2000 | Suzuki | C08K 3/36 |
| | | | | 264/331.12 |
| 6,417,294 | B1 * | 7/2002 | Obuchi | C08K 5/20 |
| | | | | 525/437 |
| 6,645,622 | B2 * | 11/2003 | Yamane | D01F 6/84 |
| | | | | 525/437 |
| 6,825,285 | B2 * | 11/2004 | Autran | C08L 67/04 |
| | | | | 525/450 |
| 7,011,289 | B2 * | 3/2006 | Singh | F16K 11/07 |
| | | | | 251/30.01 |
| 7,241,495 | B2 * | 7/2007 | Iwata | D01F 6/625 |
| | | | | 428/394 |
| 7,435,566 | B2 * | 10/2008 | Ogawa | C08G 63/90 |
| | | | | 435/135 |
| 7,718,720 | B2 * | 5/2010 | Padwa | C08K 5/0083 |
| | | | | 524/99 |
| 7,790,782 | B2 * | 9/2010 | Sato | C08K 5/0083 |
| | | | | 361/600 |
| 7,938,999 | B2 * | 5/2011 | Iwata | D01F 6/625 |
| | | | | 264/172.16 |
| 9,340,659 | B2 * | 5/2016 | Suzuki | C08K 5/053 |
| 9,475,934 | B2 * | 10/2016 | Abe | C08G 63/08 |
| 9,732,443 | B2 * | 8/2017 | Kikutani | D01F 6/625 |
| 10,030,117 | B2 * | 7/2018 | Koyama | C08K 5/053 |
| 10,173,360 | B2 * | 1/2019 | Miyazawa | B29C 49/18 |
| 10,519,473 | B2 * | 12/2019 | Kobayashi | C12Y 203/01 |
| 10,865,429 | B2 * | 12/2020 | Kobayashi | C12N 9/1029 |
| 11,279,957 | B2 * | 3/2022 | Maehara | C12P 7/62 |
| 11,466,120 | B2 * | 10/2022 | Maehara | C08G 63/06 |
| 2003/0088052 | A1 | 5/2003 | Yamane | |
| 2005/0001358 | A1 * | 1/2005 | Nakazawa | C08K 5/0083 |
| | | | | 524/415 |
| 2006/0055081 | A1 * | 3/2006 | Iwata | C08J 5/18 |
| | | | | 264/288.4 |
| 2006/0100395 | A1 | 5/2006 | Aritake | |
| 2006/0106130 | A1 | 5/2006 | Sato et al. | |
| 2006/0127998 | A1 | 6/2006 | Ogawa et al. | |
| 2008/0061467 | A1 | 3/2008 | Iwata et al. | |
| 2008/0139702 | A1 * | 6/2008 | De Almeida | C08K 5/05 |
| | | | | 524/14 |
| 2008/0226580 | A1 * | 9/2008 | Maeda | A61Q 19/008 |
| | | | | 424/78.02 |
| 2014/0088288 | A1 | 3/2014 | Iwata et al. | |
| 2015/0210801 | A1 | 7/2015 | Abe et al. | |
| 2015/0291771 | A1 | 10/2015 | Suzuki et al. | |

| | | | | |
|---|---|---|---|---|
| 2016/0230313 | A1 | 8/2016 | Kikutani et al. | |
| 2016/0251494 | A1 | 9/2016 | Koyama et al. | |
| 2017/0198313 | A1 | 7/2017 | Kobayashi et al. | |
| 2018/0305722 | A1 | 10/2018 | Kobayashi et al. | |
| 2020/0347416 | A1 | 11/2020 | Maehara | |
| 2021/0301127 | A1 | 9/2021 | Okura | |
| 2022/0203600 | A1 | 6/2022 | Maehara et al. | |
| 2023/0211539 | A1 * | 7/2023 | Maehara | D01F 6/84 |
| | | | | 264/331.21 |
| 2023/0398257 | A1 * | 12/2023 | Maehara | D01F 6/84 |

FOREIGN PATENT DOCUMENTS

| | | | | |
|---|---|---|---|---|
| EP | 0 826 803 | A2 | 3/1998 | |
| EP | 1 577 346 | A1 | 9/2005 | |
| EP | 3 970 948 | A1 | 3/2022 | |
| EP | 4 159 901 | A1 | 4/2023 | |
| JP | 64-69622 | A | 3/1989 | |
| JP | 3-24151 | A | 2/1991 | |
| JP | 4-61638 | A | 2/1992 | |
| JP | 4-84890 | A | 3/1992 | |
| JP | 6-299054 | A | 10/1994 | |
| JP | 6-345950 | A | 12/1994 | |
| JP | 7-126496 | A | 5/1995 | |
| JP | 7-177894 | A | 7/1995 | |
| JP | 7-188537 | A | 7/1995 | |
| JP | 8-27363 | A | 1/1996 | |
| JP | 8-510498 | A | 11/1996 | |
| JP | 9-131779 | A | 5/1997 | |
| JP | 9-507441 | A | 7/1997 | |
| JP | 9-278991 | A | 10/1997 | |
| JP | 10-60099 | A | 3/1998 | |
| JP | 10-504583 | A | 5/1998 | |
| JP | 10-158369 | A | 6/1998 | |
| JP | 10-176070 | A | 6/1998 | |
| JP | 11-5849 | A | 1/1999 | |
| JP | 11-116783 | A | 4/1999 | |
| JP | 2002/371431 | A | 12/2002 | |
| JP | 2003-192884 | A | 7/2003 | |
| JP | 2003-238779 | A | 8/2003 | |
| JP | 2003-327803 | A | 11/2003 | |
| JP | 2003-328230 | A | 11/2003 | |
| JP | 2003-328231 | A | 11/2003 | |
| JP | 2004-161802 | A | 6/2004 | |
| JP | 2004-250629 | A | 9/2004 | |
| JP | 2004-331913 | A | 11/2004 | |
| JP | 2006-282940 | A | 10/2006 | |
| JP | 2007-77232 | A | 3/2007 | |
| JP | 2007-517126 | A | 6/2007 | |
| JP | 2009-24058 | A | 2/2009 | |
| JP | 4245306 | B2 | 3/2009 | |
| JP | 2009-96849 | A | 5/2009 | |
| JP | 2010-229407 | A | 10/2010 | |
| JP | 2010241075 | A * | 10/2010 | B29C 47/92 |
| JP | 2017-101256 | A | 6/2017 | |
| JP | 2019-119839 | A | 7/2019 | |
| JP | 2019-119840 | A | 7/2019 | |
| WO | WO 94/28070 | A1 | 12/1994 | |
| WO | WO 95/17454 | A1 | 6/1995 | |
| WO | WO 95/34599 | A1 | 12/1995 | |
| WO | WO 02/50461 | A1 | 6/2002 | |
| WO | WO 02/055581 | A2 | 7/2002 | |
| WO | WO 2004/029266 | A1 | 4/2004 | |
| WO | WO 2004/058893 | A1 | 7/2004 | |
| WO | WO 2005/066256 | A1 | 7/2005 | |
| WO | WO 2006/012917 | A1 | 2/2006 | |
| WO | WO 2006/038373 | A1 | 4/2006 | |
| WO | WO 2008/099586 | A1 | 8/2008 | |
| WO | WO 2012/133231 | A1 | 10/2012 | |
| WO | WO 2014/068943 | A1 | 5/2014 | |
| WO | WO 2015/029316 | A1 | 3/2015 | |
| WO | WO 2015/052876 | A1 | 4/2015 | |
| WO | WO 2015/146195 | A1 | 10/2015 | |
| WO | WO 2017/056442 | A1 | 4/2017 | |
| WO | WO 2019/044837 | A1 | 3/2019 | |
| WO | WO 2020/040093 | A1 | 2/2020 | |

(56)                    References Cited

FOREIGN PATENT DOCUMENTS

WO      WO 2020/230807  A1      11/2020
WO      WO 2021/246434  A1      12/2021

OTHER PUBLICATIONS

International Preliminary Report on Patentability and Written Opinion issued Jul. 20, 2021 in PCT/JP/2021/020956 (with English Translation of Written Opinion), 8 pages.
International Search Report and Written Opinion issued Jul. 20, 2021 in PCT/JP2021/020956 (with English Translation of Search Report Only), 12 pages.
Anderson et al., "Occurrence, Metabolism, Metabolic Role and Industrial Uses of Bacterial Polyhydroxyalkanoates", Microbiological Reviews, vol. 54, No. 4, Dec. 1990, pp. 450-472.
Abe et al., "Biosynthesis from gluconate of a random copolyester consisting of 3-hydroxybutyrate and medium-chain-length 3-hydroxyyalkanoates by *Pseudomonas* sp. 61-3", International Journal of Biological Macromolecules, vol. 16, No. 3, 1994, pp. 115-119.
Kato et al., "Biosynthesis of Polyester Blends by *Pseudomonas* sp. 61-3 from Alkanoic Acids", Bull. Chem. Soc. Jpn, vol. 69, 1996, pp. 515-520.

Matsusaki et al., "Cloning and Molecular Analysis of the Poly(3-hydroxybutyrate) and Poly(3-hydeoxybutyrate-co-3-hydroxyalkanoate) Biosynthesis Genes in *Pseudomonas* sp. Strain 61-3", Journal of Bacteriology, vol. 180, No. 24, Dec. 1998, pp. 6459-6467.
Kusaka et al., "Molecular mass of poly[(R)-3-hydroxybutyric acid] produced in a recombinant *Escherichia coli*", Appl. Microbiol. Biotechnol., vol. 47, 1997, pp. 140-143.
Kabe et al., "Physical and Structural Effects of Adding Ultrahigh-Molecular-Weight Poly[(R)-3-hydroxybutyrate] to Wild-type Poly[(R)-3-hydroxybutyrate]", Macromolecules, vol. 45, Feb. 13, 2012, pp. 1858-1865.
Kabe et al., "Processing, Mechanical Properties, and Structure Analysis of Melt-Spun Fibers of p(3HB)/UHMW-P(3HB) Identical Blend", ACS symposium series on Biobased Monomers, Polymers, and Materials, 2012, pp. 63-75.
Chiba, "KANEKA Biodegradable Polymer PHBH™", Journal of packaging Science and Technology, vol. 28, No. 2, 2019, pp. 109-115.
Combined Chinese Office Action and Search Report issued Jan. 22, 2024 in Chinese Patent Application No. 202180039562.5, 7 pages.
Extended European Search Report issued Nov. 7, 2024 in European Patent Application No. 21818592.4, 8 pgs.
Office Action dated Jun. 17, 2025 issued in the corresponding Japanese patent application No. 2022-528859, with English Translation, 6 pages.

* cited by examiner

METHOD FOR PRODUCING POLYMERIC MOLDED PRODUCT

CROSS-REFERENCE TO RELATED APPLICATIONS

The present application is a 35 U.S.C. § 371 national stage patent application of International patent application PCT/JP2021/020956, filed on Jun. 2, 2021, which is based on and claims the benefits of priority to Japanese Application No. 2020-096144, filed on Jun. 2, 2020. The entire contents of these applications are incorporated herein by reference.

BACKGROUND OF THE INVENTION

Field of the Invention

The present invention relates to a method of molding a crystalline thermoplastic polymer having lamellar crystals different in thickness, length, width and crystallinity. The method comprises molding the crystalline thermoplastic polymer in a partially melted state where some of the crystals are not melted, instead of melting all the crystals and then molding. That is, the present invention relates to a method for melt-molding a polymer at a temperature where lamellar crystals having a melting point in a higher temperature range do not readily undergo melting, and lamellar crystals having a melting point in a lower temperature range and an amorphous region undergo melting and flowing.

In addition, in a case where a melting point of the polymer is close to a thermal decomposition temperature, which causes a reduction in molecular weight due to heating, a molecular weight of the polymer may be reduced when the polymer is in a melted state. The present invention relates to a molding method that does not cause a considerable reduction in molecular weight during molding, even for such a polymer.

The present invention also relates to a spinning method in which crystallization is slow and agglutination of fibers in a melt-spinning step is prevented. Furthermore, the present invention relates to a spinning method that prevents agglutination even in a polymer whose glass transition point is lower than room temperature and which is likely to agglutinate during fiberization. The agglutination is a state where fibers stick to each other due to increased tackiness of a polymer, thereby making it difficult to unravel the fibers.

Description of Related Art

Polyhydroxyalkanoates (hereinafter abbreviated as PHAs in some cases) are thermoplastic polyesters that are accumulated in microorganisms and that have been drawing attention as a biodegradable, biocompatible, and bioabsorbable plastic, and many studies have been conducted (Non-Patent Document 1). One hundred (100) or more types of monomer units constituting PHA are known. Representative PHA is poly-3-hydroxybutyrate (hereinafter, abbreviated as P(3HB)) comprising (R)-3-hydroxybutyrate (also referred to as (R)-3-hydroxybutyric acid; hereinafter, abbreviated as 3HB) (Non-Patent Document 1).

P(3HB) has a melting point of approximately from 175 to 180° C., which is as high as that of polypropylene (hereinafter abbreviated as PP). P(3HB) has an equivalent fracture strength to that of PP, but has an elongation at fracture of 5% or less and a glass transition point of 4° C. (room temperature or lower).

P(3HB) is often not used for a molded body such as a single film, because it is highly crystalline, hard, and brittle. In a case where an attempt is made to industrially utilize PHA, as methods for improving the physical properties thereof (crystallinity, mechanical property, etc.), a method of introducing a second component monomer unit to form a copolymer, a method of increasing the molecular weight, a method of forming a complex with dissimilar polymeric materials, and the like have been known.

PHA, including P(3HB), is susceptible to thermal decomposition. Although no significant weight loss occurs near the melting point of P(3HB), cleavage of a polymerization strand is known to cause a reduction in molecular weight, and there is a great problem that the molecular weight is likely to be reduced when it is in a melted state. Also, a crystallization rate of PHA is significantly slower than that of a traditional industrial polymer, and its glass transition point is below room temperature. In a case where PHA is molded through a heat-melted state, there are some problems in mold processing; for example, that a cooling time for solidification is long, which leads to poor productivity; that, in melt-spinning, due to slow crystallization, yarns are wound in an amorphous state which leads to agglutination of the yarns; that the yarns must be wound so as not to overlap in order to avoid agglutination; and that a long cooling time is required for solidification (crystallization) after winding. In addition, the slow crystallization rate leads to considerable growth of spherulites, and also affects deterioration in physical properties of the molded product and the deterioration over time. Copolymerization may cause a further lower nucleation density, i.e., a reduction in crystallization rate, and the problems described above in mold processing still remain even when copolymerization is performed. Furthermore, there is another problem that melt viscosity is too high when the molecular weight is high.

Various crystal nucleating agents have been investigated for the purpose of improving the crystallization rate in melt-molding of thermoplastic polymeric materials such as polyesters.

As a known crystal nucleating agent, for example, adding the following materials to a specific polyester is known:

an inorganic substance, as a simple substance, such as Zn powder, Al powder, graphite, or carbon black;

a metal oxide such as ZnO, MgO, Al2O3, TiO2, MnO2, SiO2, or Fe3O4;

a nitride such as aluminum nitride, silicon nitride, titanium nitride, or boron nitride;

an inorganic salt such as Na2CO3, CaCO3, MgCo3, CaSO4, CaSiO3, BaSO4, or Ca3(PO4)3;

a clay such as talc, kaolin, clay, or white clay;

an organic salt such as calcium oxalate, sodium oxalate, calcium benzoate, calcium phthalate, calcium tartrate, magnesium stearate, or polyacrylate;

a polymeric compound such as polyester, polyethylene or polypropylene;

or the like (Patent Document 1).

Further, as a crystal nucleating agent for PHA, granules such as talc, atomized mica, boron nitride, and calcium carbonate have been tried. As a more effective method, there is known a method of tightly mixing organic phosphonic acids such as cyclohexyl phosphonic acid or organic phosphinic acids or esters thereof, or derivatives of the acids or esters, and metal compounds such as oxides, hydroxides and saturated or unsaturated carboxylic acid salts of metals belonging to Groups IA to VA or Groups IB to VB of the periodic table together (Patent Document 2).

Furthermore, the following materials are known as nucleating agents for PHA:

sorbitol and sodium benzoate (Patent Document 3);

sugar alcohols such as erythritol, D-arabitol, ribitol, xylitol, galactitol, D-mannitol, L-mannitol, D-sorbitol, myo-inositol, and scyllo-inositol (Patent Document 4);

polyvinyl alcohol, chitin, and chitosan (Patent Document 5);

polyalkylene oxides such as polyethylene oxide, polypropylene oxide, and polybutylene oxide (Patent Document 6);

aliphatic carboxylic acid amides, aliphatic carboxylic acid salts, aliphatic alcohols, and aliphatic carboxylic acid esters to aliphatic polyesters such as polylactic acid and PHA (Patent Document 7 to 9);

fatty acid esters such as dimethyl adipate, di-2 ethylhexyl adipate, diisobutyl adipate, dibutyl adipate, diisodecyl adipate, dibutyl diglycol adipate, dibutyl sebacate and di-2 ethylhexyl sebacate (Patent Document 10);

cyclic compounds having C=O and a functional group selected from NH, S, and O in the molecule, such as indigo, quinacridone, and quinacridone magenta (Patent Document 11);

ketopyrroles which are cyclic compounds having C=O and an NH group in the molecule (Patent Document 12);

sorbitol-based derivatives such as bisbenzylidene sorbitol and bis(p-methylbenzylidene) sorbitol (Patent Document 13);

compounds containing nitrogen-containing heteroaromatic nuclei such as pyridine, pyrimidine, pyrazine, pyridazine, triazine and imidazole (Patent Document 14);

phosphoric acid ester compounds (Patent Document 15);

bisamides of higher fatty acids and metal salts of higher fatty acids (Patent Document 16);

fatty acids and fatty acid amides (Patent Document 17);

branched polylactic acids (Patent Document 18);

pentaerythritol (Patent Document 19);

pentaerythritol and inorganic and organic fillers (Patent Document 20);

sorbitol acetal, compounds having an amide bond, and pentaerythritol (Patent Document 21);

amino acids such as tryptophan, phenylalanine, p-chlorophenylalanine, m-tyrosine, phenylglycine, p-hydroxyphenylglycine, methionine, o-tyrosine and valine, and phosphatidylcholine (Patent Documents 22 to 24);

dipeptides such as aspartame (Patent Document 25); and nucleic acid bases such as uracil and thymine (Patent Document 26).

These are means employed to promote the slow crystallization speed of aliphatic polyesters such as PHA and polylactic acid and to improve processability during formation and processing; however, there are still problems, such as causing a reduction in strength, exhibiting an insufficient effect including deterioration in surface appearance of a molded body, and requiring further addition of another additive. In addition, due to progress of crystallization after molding depending on the type of nucleating agent, the nucleating agent may be pushed out of the crystal due to differences in compatibility and molecular weight, thereby causing bloom and bleeding. In such cases, additives may be further required, such as dispersing agents, anti-aggregation agents, compatibilizers, and the like. The above nucleating agents also include those including non-toxic fatty acids and amino acids that are easily decomposed and absorbed or metabolized in the body, assuming that they will be used in the living body, but, at present, substantially effective crystal nucleating agents have not been found yet.

Also, attempts have also been made to blend other PHAs and biodegradable polymers for the purpose of improving the crystallization properties of PHA. Patent Documents 27 to 29 disclose addition of P(3HB) having a higher melting point, as a crystal nucleating agent (nucleating material), to a P(3HB-co-3HV) copolymer comprising 3HB and 3-hydroxyvalerate (3-hydroxyvaleric acid, hereinafter abbreviated as 3HV), a P(3HB-co-3HHx) copolymer comprising 3HB and 3-hydroxyhexanoate (abbreviated as 3-hydroxyhexanoic acid, hereinafter abbreviated as 3HHx), or a P(3HB-co-3HO) copolymer comprising 3HB and 3-hydroxyoctanoate (3-hydroxyoctanoic acid, hereinafter abbreviated as 3HO).

Patent Documents 27 to 29 describes mixing methods such as:

dry mixing in which blended dry powder PHA is mixed as it is or in the presence of dry ice;

solution mixing in which PHA is stirred and mixed while it is partially or wholly dissolved in a solvent such as chloroform, then the solvent is evaporated to precipitate a polymer, or to precipitate it in a poor solvent; and so-called partial melt mixing in which PHA is sufficiently stirred and mixed at a temperature where added P(3HB) having a higher melting point is not melted, and added PHA having a lower melting point (in the Examples, P(3HB-co-3HV), P(3HB-co-3HHx), or P(3HB-co-3HO)) is in a melted state, and refers to necessity that a small amount of the mixed P(3HB) having the higher melting point should be finely and uniformly dispersed in the PHA copolymer having the lower melting point.

Each of the mixing methods described above has a disadvantage. In the dry mixing, even though the polymer powder is mixed, there is a limit in uniform mixing at or below a powder particle size. The solution mixing requires a large amount of a good solvent such as chloroform. In a case where reprecipitation and recovery are performed, a still larger amount of the poor solvent is required, which is from 5 to 10 times the amount of the good solvent, and the polymer species that precipitate due to a difference in solubility during reprecipitation may be biased. Even in a partially melted state of the blend, the added P(3HB) having high crystallinity and a high melting point may not be suitable for forming a fine uniform microcrystalline nucleus, since P(3HB) particles may be mixed without melting at approximately its intact size. The method, in which mixing is performed at a temperature raised to be equal to or higher than the melting point of P(3HB), such that the blend is uniformly mixed, is general melt mixing, but, near the melting point of P(3HB), PHAs which include P(3HB) are inevitably deteriorated by thermal decomposition and stirring, and lowered in molecular weight.

Not a method for promoting crystallization by blending P(3HB) once taken out from bacterial cells and PHA copolymers, but a method has also been reported, wherein P(3HB) and 3HB-rich PHA, which can serve as crystal nuclei, are produced, as blend bodies, together with other PHA copolymers in bacterial cells during culture, and thus P(3HB) and PHA need not to be blended after PHA is taken out from the bacterial cells. Patent Document 30 describes a method for producing P(3HB-co-3HHx) with a low ratio of P(3HB) or 3HHx, together with P(3HB-co-3HHx) having an increased ratio of 3HHx, by changing feed of carbon sources in the middle of culture. Patent Documents 31 and 32 disclose methods of producing a blend body of PHAs having different melting points in the same cell by retaining a plurality of kinds of PHA polymerization enzymes different in substrate specificity in the same bacterial cell by a gene recombination technique. Although these patent documents describe that mold processing can be performed at a temperature of 170° C. or lower, it is unclear in what temperature range melting and processing can be performed. In known mold processing, it is common to perform molding after melting at a temperature not lower than the melting point of the polymer, and the patent documents also aim at improving the solidification rate (crystallization rate) of once melted PHA blend bodies.

In Non-Patent Documents 2 to 4, P(3HB) is not intended to serve as crystalline nuclei. However, these Non-Patent Documents describe a PHA-producing wild strain that produces a blend of P(3HB) and a PHA copolymer in the same bacterium, and also describe blend production of P(3HB) homopolymers and C4 to C12 PHA copolymers, by naturally retaining PHA polymerizing enzymes with different substrate specificities in the same cell.

On the other hand, there are also a report on the use of an ultra-high molecular weight body P(3HB), and a report that strength is increased by controlling crystal formation independently of molecular weight. For example, an ultra-high molecular weight P(3HB) having a number average molecular weight of 1.5 million or greater (weight average molecular weight: 3 million) using a recombinant *E. coli* has been biosynthesized, and a P(3HB) film with improved physical properties has been obtained using the ultra-high molecular weight P(3HB) (Patent Document 33 and Non-Patent Document 5).

Furthermore, as a method of fiberization of P(3HB) independent of molecular weight, P(3HB) fibers have been obtained by melt extruding P(3HB); rapidly cooling the extruded P(3HB) to a glass transition temperature+15° C. or lower; solidifying it to produce amorphous fibers; cold drawing the amorphous fibers; orienting molecular chains of the amorphous fibers; and thermally treating the fibers (Patent Documents 34 and 35). Furthermore, there is also disclosed (Patent Document 36) a method for producing a fiber that is characterized by quenching the melt extruded fiber to a temperature not higher than a glass transition temperature+15° C. and then solidifying the melt extruded fiber, and leaving the amorphous fiber to stand at a temperature not higher than a glass transition temperature of PHA+15° C. to form crystallized fibers in which the microcrystalline nuclei have been formed (isothermal crystallization), and then subjecting the crystallized fibers to stretching and, further heat treatment under tension (referred to as "microcrystalline nucleus-stretching method" hereinafter).

However, the producing efficiency of the ultra-high molecular weight P(3HB) is poor so that cost is expensive, the cold stretching method requires quenching the melt to a low temperature near the glass transition temperature to obtain amorphous fibers, and the microcrystalline nucleus-stretching method requires quenching the fiber to a low temperature near the glass transition temperature to produce the micro-crystals of the melted P(3HB) and then storing the fiber at the low temperature for a long period of time. Therefore, the methods described above are industrially disadvantageous.

Non-Patent Document 6 describes the method of adding an ultra-high molecular weight body P(3HB) having a weight average molecular weight of 2.70 million made by recombinant *E. coli* to P(3HB) derived from an ordinary microorganism and having a weight average molecular weight of 520000, dissolving the mixture in chloroform, then molding it into a cast film, hot-pressing the cast film at 200° C., quenching the cast film with ice water, and then cold-stretching the cast film to produce a trace ultra-high molecular weight body-added P(3HB) film. It is suggested that, in the crystal growth observation, the trace ultra-high molecular weight body-added P(3HB) film after reheating at 200° C. behaves like a nucleating agent and promotes nucleation. There is a report that ultra-high molecular weight P(3HB) having a weight average molecular weight of 3.47 million was added, in a small amount, to P(3HB) having a weight average molecular weight of 520000, and that the mixture was subjected to melt spinning at 180° C., 190° C., and 200° C. (Non-Patent Document 7). This document describes that, while the molecular weight was reduced by heating and melting at or above the melting point, the addition of the ultra-high molecular weight P(3HB) suppressed the thermal decomposition at an initial stage of decomposition of P(3HB) and improved the processability of melt spinning. It has been reported that blend P(3HB) fibers with addition of 5 wt. % of ultra-high molecular weight P(3HB) exhibited a strength of 740 MPa by cooling the fiber to 4° C. after melt spinning and application of two-step cold stretching. Although the amount of the ultra-high molecular weight P(3HB) used can be small, two-stage cold stretching in a cooled state at 4° C. is required, the operation is complicated, and the method cannot be said to be suitable for industrialization.

In addition, it has been reported that, when a molding material composed mainly of a biodegradable polyester having a melting point in a specific range is melt-molded at a heating temperature in a specific range to produce a melt-molded product, a cold crystallization heat, and a sum of the melting heat and the cold crystallization heat are set to specific ranges as indexes of crystallization ability and the degree of crystallinity of each obtained melt-molded product to produce a melt-molded product (Patent Document 37). Furthermore, it has been reported that a copolymer of 3HB and 3-hydroxyhexanoate is processed at a temperature (around 160° C.) at which the crystals of the copolymer are not completely melted (Non-Patent Document 8). Furthermore, a tube comprising a poly (3-hydroxybutyrate)-based resin has been reported, in which a difference between a melting point peak temperature and a melting point peak end temperature in differential scanning calorimetry of the poly (3-hydroxybutyrate)-based resin is 10° C. or greater (Patent Document 38). Furthermore, a method for producing a biodegradable resin molded body has been reported, characterized in that, when a biodegradable resin composition containing poly(3-hydroxy alkanoate) is heat melted and kneaded to mold a molded body, a residual crystal amount at an outlet of a molding machine after heat melting and kneading is confirmed by near-infrared spectroscopic spectra, and the residual crystal amount at the outlet of the molding machine is adjusted so that a crystallization peak of the molded body by near-infrared spectroscopy is observed within 200 seconds immediately after molding (Patent Document 39). However, this patent document does not describe that the melt-molding temperature is set to a temperature which is higher than an outflow onset temperature according to a flow tester temperature raising method and indicates that crystal melting as measured by a differential scanning calorimeter is entirely completed (in particular, a temperature lower than an extrapolated melting offset temperature).

CITATION LIST

Patent Documents

Patent Document 1: JP 07-126496 A
Patent Document 2: JP 03-024151 A
Patent Document 3: WO 2006/012917
Patent Document 4: WO 2008/099586
Patent Document 5: JP 2007-077232 A
Patent Document 6: JP 2010-229407 A
Patent Document 7: JP 09-278991 A
Patent Document 8: JP 11-005849 A
Patent Document 9: JP 07-188537 A
Patent Document 10: JP 11-116783 A
Patent Document 11: JP 2003-238779 A
Patent Document 12: JP 2003-327803 A
Patent Document 13: JP 10-158369 A
Patent Document 14: JP 2007-517126 T
Patent Document 15: JP 2003-192884 A
Patent Document 16: JP 6-299054 A
Patent Document 17: JP 8-27363 A
Patent Document 18: JP 2009-024058 A
Patent Document 19: JP 2017-101256 A
Patent Document 20: WO 2015/052876
Patent Document 21: WO 2014/068943
Patent Document 22: JP 2006-282940 A
Patent Document 23: JP 06-345950 A
Patent Document 24: JP 10-504583 T
Patent Document 25: JP 2019-119839 A
Patent Document 26: JP 2019-119840 A
Patent Document 27: JP 08-510498 T
Patent Document 28: WO 2002/055581
Patent Document 29: WO 2002/050461
Patent Document 30: JP 2004-250629 A
Patent Document 31: WO 2015/146195
Patent Document 32: WO 2017/056442
Patent Document 33: JP 10-176070 A
Patent Document 34: JP 2003-328230 A
Patent Document 35: JP 2003-328231 A
Patent Document 36: WO 2006/038373
Patent Document 37: JP 4245306 B
Patent Document 38: WO 2020/040093
Patent Document 39: JP 2010-241075 A

Non-Patent Documents

Non-Patent Document 1: Alistair J. Anderson et al., Microbiological Reviews, Vol. 54, No. 4, 450-472, 1990
Non-Patent Document 2: H. Abe, et al., International Journal of Biological Macromolecules, 1994, vol. 16, 115-119.
Non-Patent Document 3: M. Kato et al., Bull. Chem. Soc. Jpn, 1996, vol. 69, 515-520.
Non-Patent Document 4: H. Matsusaki et al., Journal of bacteriorogy, 1998, vol. 180, 6459-6467.
Non-Patent Document 5: Kusaka et al., Appl. Microbiol. Biotechnol., 47 140-143 (1997). Molecular mass of poly [(R)-3-hydroxybutyric acid] produced in a recombinant *Escherichia coli*.
Non-Patent Document 6: T. Kabe et al., Macromolecules, 2012, 45, 1858-1865.
Non-Patent Document 7: T. Kabe en al., ACS synposium series on Biobased Monomers, Polymers, and Materials, Chaper 5, 63-75.
Non-Patent Document 8: Journal of packaging science & technology, Japan, Vo. 28, No. 2 (2019) 109-115

BRIEF SUMMARY OF THE INVENTION

As described above, known methods have been developed from the following perspectives: melting a crystalline polymer (polyester) that crystallizes slowly and then rapidly subjecting the polymer to primary nucleation; preventing formation of large defective spherulites; crystallizing the polymer so as to increase strength; and solidifying and crystallizing the polymer so that it can be easily processed. In melt-molding of a biodegradable crystalline polymer, various attempts have been made to promote crystallization for the purpose of improving poor processability due to slow crystallization rate and increasing strength. However, there is still room for improvement.

In the present invention, an object of the present invention is to provide a method for producing a polymeric molded product, wherein the method does not cause molecular weight reduction during melt-molding, even for a polymer that may readily undergo molecular weight reduction in a melted state. Another object of the present invention is to provide a method for producing a polymeric molded product, wherein the method can reduce a crystallization time of a polymer that crystallizes slowly (e.g., a biodegradable polyester), improve melt processability of the polymer in processing such as injection molding, blow molding, film molding, fiber spinning, extrusion foaming or bead foaming, and enhance productivity.

Means for Solving Object

As a result of diligent research in order to solve the objects described above, the present inventors have noted that a semi-crystalline PHA copolymer having an appropriate composition does not have only a single melting point, but that the copolymer can have crystals internally, including lamellar crystals different in thickness, (an aggregate of crystalline segments), and is an aggregate of fine lamellar crystals and amorphous regions, which has various melting points. The present inventors have found that the copolymer can be melt processed, in a state where fine but thick lamellar crystals are not melted, by melting (that is, partially melting) the copolymer at a temperature which is lower than a temperature where the entire copolymer can be melted, and at which amorphous regions and fine lamellar crystals that are relatively thin and have a lower melting point undergo flowing. The present inventors also have found that the thick fine lamellar crystals that are not melted are already in a uniformly dispersed state inside or between the molecular chains, and thus that the copolymer can be immediately molded from the partially melted state without need to wait for crystal primary nucleation after melting as in complete melting. The present inventors also have found that the poor processing properties resulting from tackiness caused by the amorphous state when the polyester (PHA) is melt processed can be dramatically improved, and that it is also possible to prevent a significant reduction in molecular weight by molding at a temperature lower than a thermal decomposition temperature of the PHA. The present invention has been completed based on the findings described above.

According to the present invention, the following inventions are provided.

<1> A method for producing a polymeric molded product, which comprises melt-molding a polymer comprising lamellar crystals that are different in lamella thickness, in a temperature range where some of the lamellar crystals undergo melting and flowing, and the other balance lamellar crystals remain unmelted.

<2> The method according to <1>, wherein the temperature range is a range which is higher than an outflow onset temperature according to a flow tester temperature raising method and lower than a temperature indicating completion of crystal melting determined by a differential scanning calorimeter.

<3> The method according to <1> or <2>, wherein the temperature range is a range which is higher than the outflow onset temperature according to the flow tester temperature raising method and lower than an extrapolated melting offset temperature.

<4> The method according to any one of <1> to <3>, which comprises cooling the melted polymer in air, in the temperature range where some of the lamellar crystals undergo melting and flowing, and the other balance lamellar crystals remain unmelted.

<5> The method according to any one of <1> to <4>, wherein the melt-molding is molding through melt extrusion.

<6> The method according to any one of <1> to <5>, wherein the melt-molding is molding through melt extrusion spinning.

<7> The method according to any one of <1> to <6>, wherein the melt-molding is performed once.

<8> The method according to any one of <1> to <7>, wherein the polymer comprises a thermoplastic resin.

<9> The method according to any one of <1> to <8>, wherein the polymer comprises a polyester.

<10> The method according to any one of <1> to <9>, wherein the polymer comprises an aliphatic polyester.

<11> The method according to any one of <1> to <10>, wherein the polymer comprises a biodegradable polymer.

<12> The method according to any one of <1> to <11>, wherein the polymer is a copolymer containing 3-hydroxybutyric acid as a monomer unit.

<13> The method according to any one of <1> to <12>, wherein the polymer comprises poly-L-lactic acid, poly-p-dioxanone, polybutylene succinate, polybutylene succinate adipate, or a copolymer of glycolic acid and lactic acid.

<14> The method according to any one of <1> to <13>, wherein the polymer is a copolymer comprising the 3-hydroxybutyric acid and 4-hydroxybutyric acid as monomer units, and a proportion of the 4-hydroxybutyric acid is 5 mol % or greater and 40 mol % or less.

Advantageous Effects of Invention

With the method for producing a polymeric molded product according to the present invention, a reduction in molecular weight during melt-molding can be suppressed, even for a polymer whose molecular weight is likely to be reduced when it is in a melted state. With the method for producing a polymeric molded product according to the present invention, a crystallization time of a polymer can be reduced, melt processability of the polymer in processing such as injection molding, blow molding, film molding, fiber spinning, extrusion foaming or bead foaming can be improved, and productivity can be enhanced.

of Example 1. An extrapolated melting offset temperature (158.7° C.) of Example 1 and a temperature (167.0° C.) at which the DSC curve returns to a baseline are shown.

Figure 3:
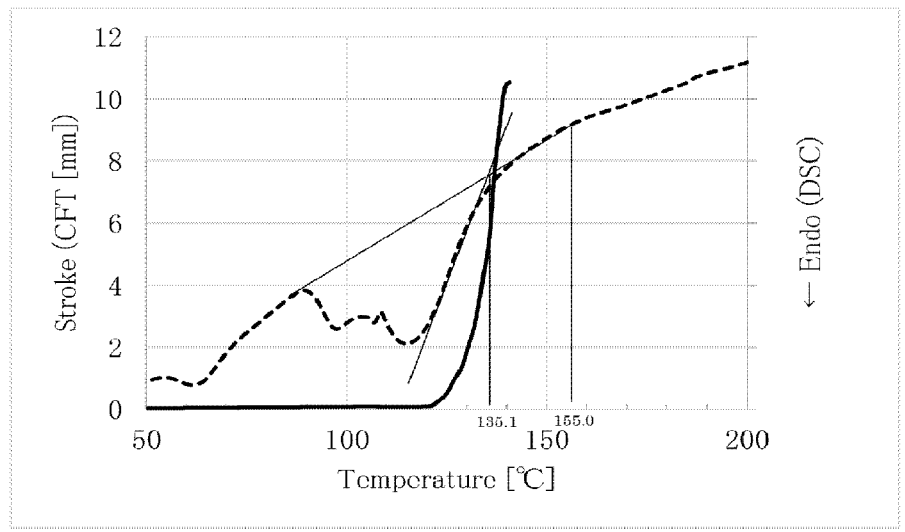

FIG. 3 shows a flow curve (solid line) and a DSC curve (dashed line), according to the flow tester temperature raising method, of Sample S3 (P(3HB-co-13.1 mol % 4HB) of Example 2. An extrapolated melting offset temperature (135.1° C.) of Example 2 and a temperature (155.0° C.) at which the DSC curve returns to a baseline are shown.

Figure 4:
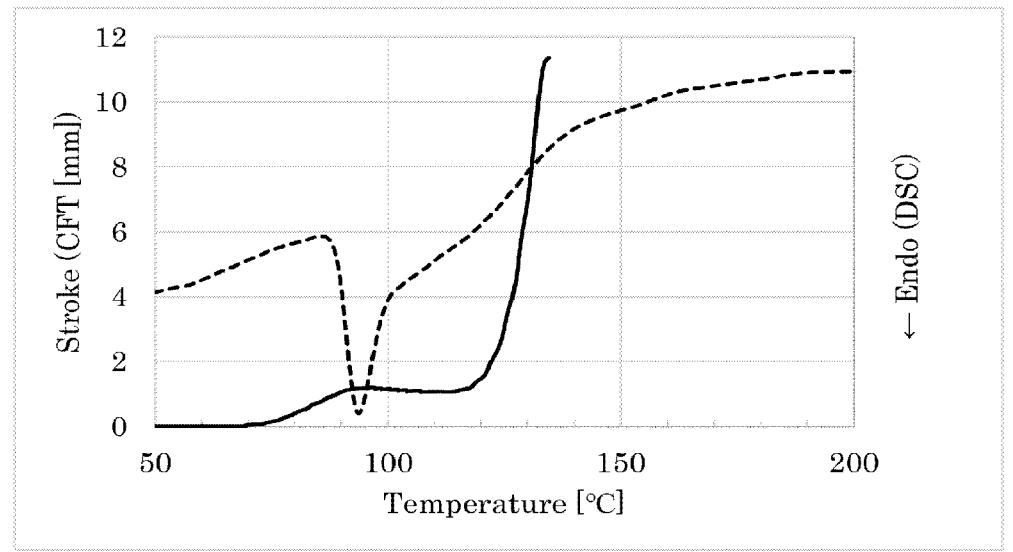

FIG. 4 shows a flow curve (solid line) and a DSC curve (dashed line), according to the flow tester temperature raising method, of Sample S34 (P(3HB-co-14.7 mol % 4HB) of Example 3.

Figure 5:
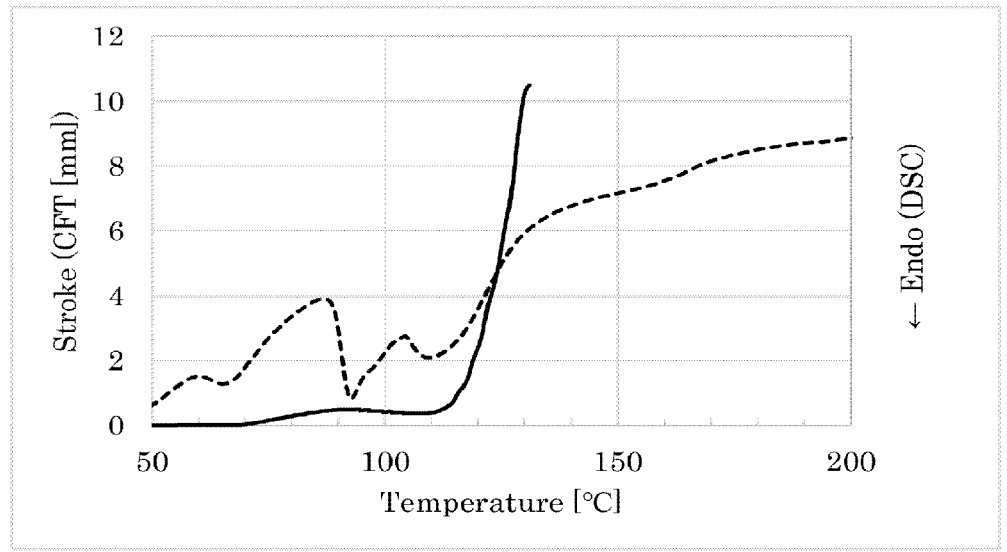

FIG. 5 shows a flow curve (solid line) and a DSC curve (dashed line), according to the flow tester temperature raising method, of Sample S5 (P(3HB-co-15.3 mol % 4HB) of Example 4.

Figure 6:
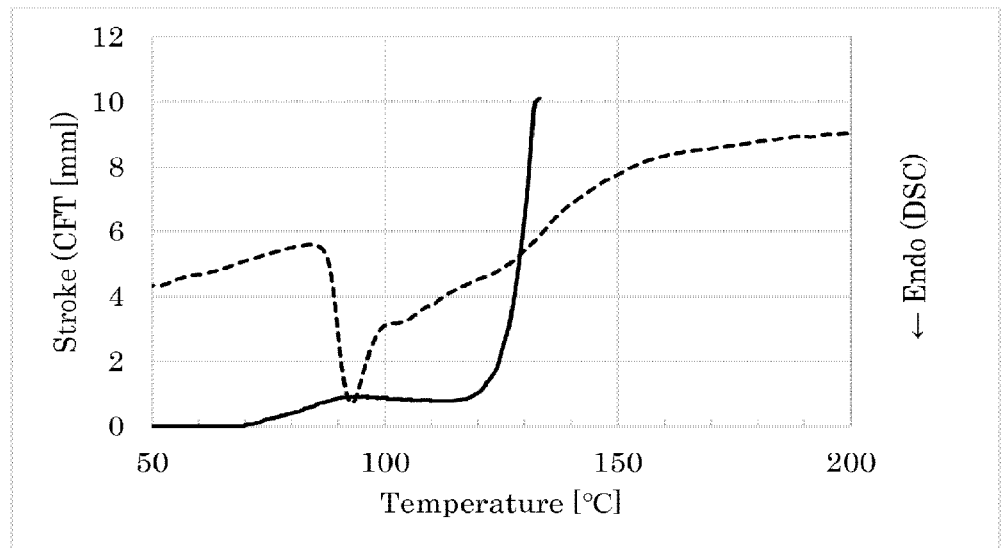

FIG. 6 shows a flow curve (solid line) and a DSC curve (dashed line), according to the flow tester temperature raising method, of Sample S6 (P(3HB-co-15.3 mol % 4HB) of Example 5.

Figure 7:
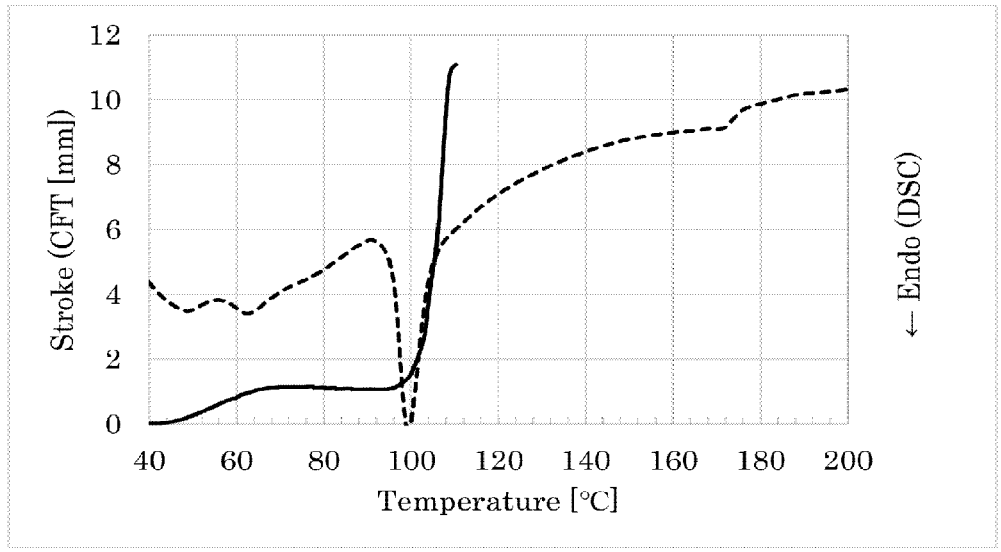

FIG. 7 shows a flow curve (solid line) and a DSC curve (dashed line), according to the flow tester temperature raising method, of Sample S7 (P(3HB-co-16.0 mol % 4HB) of Example 6.

Figure 8:
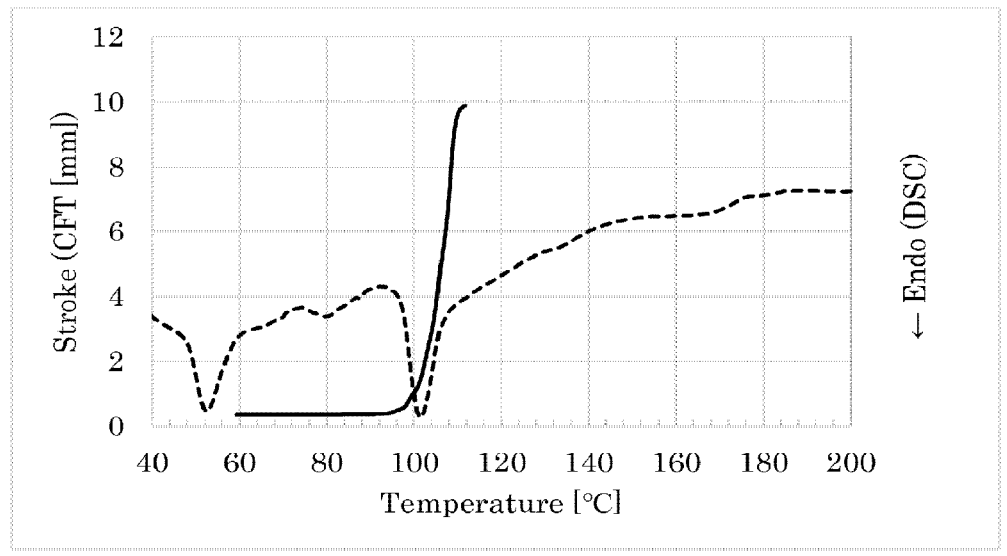

FIG. 8 shows a flow curve (solid line) and a DSC curve (dashed line), according to the flow tester temperature raising method, of Sample S8 (P(3HB-co-17.8 mol % 4HB) of Example 7.

Figure 9:
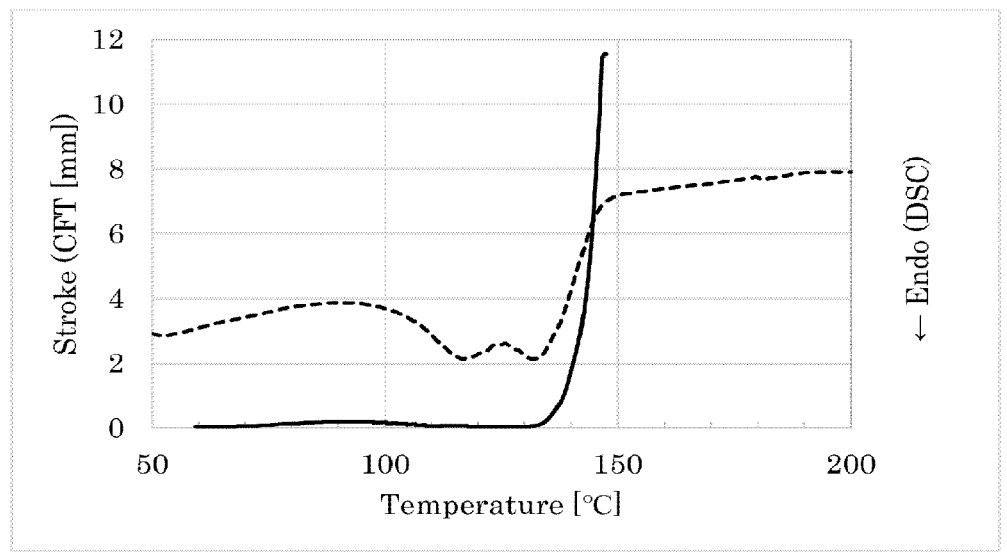

FIG. 9 shows a flow curve (solid line) and a DSC curve (dashed line), according to the flow tester temperature raising method, of Sample S9 (P(3HB-co-17.9 mol % 4HB) of Example 8.

Figure 10:
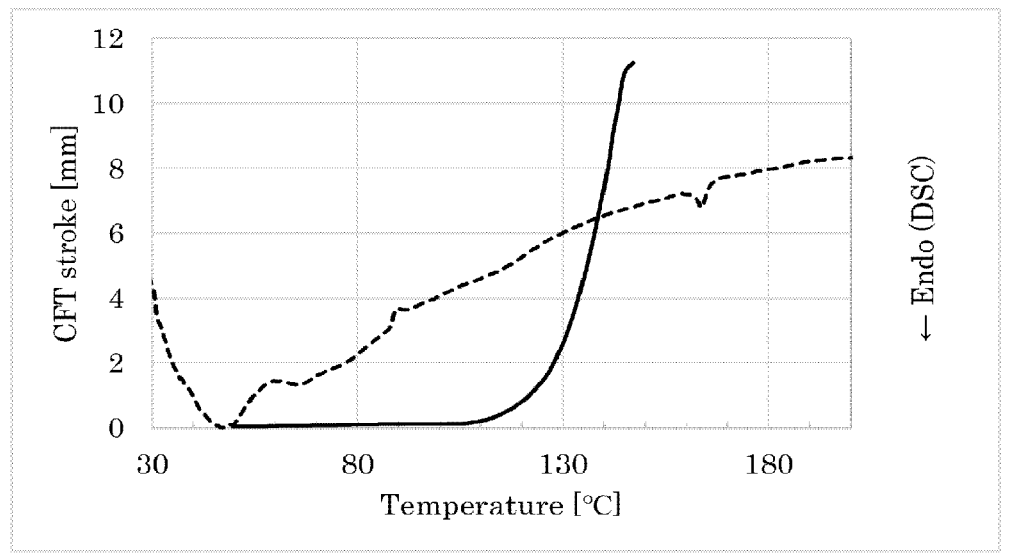

FIG. 10 shows a flow curve (solid line) and a DSC curve (dashed line), according to the flow tester temperature raising method, of Sample S10 (P(3HB-co-28.7 mol % 4HB) of Example 9.

Figure 11:
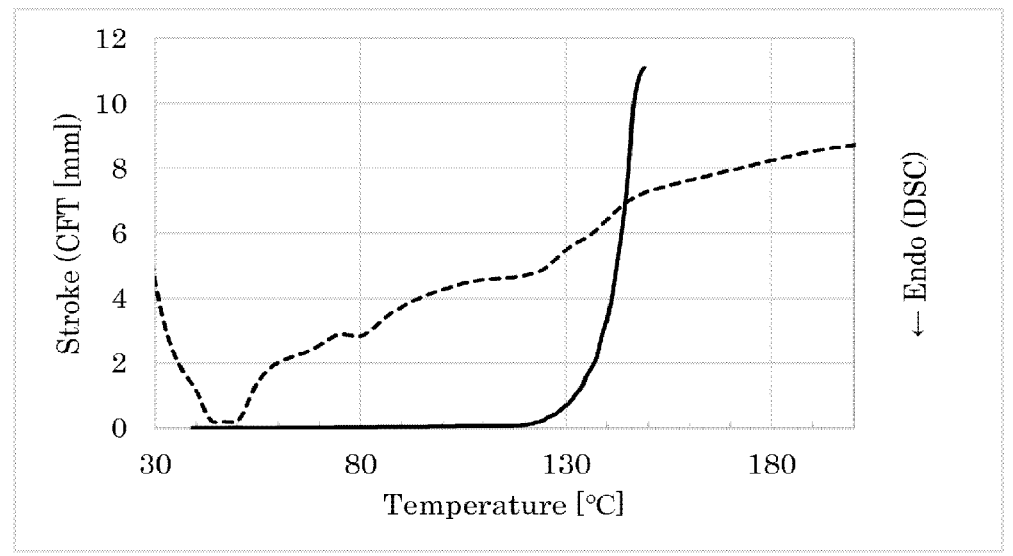

FIG. 11 shows a flow curve (solid line) and a DSC curve (dashed line), according to the flow tester temperature raising method, of Sample S11 (P(3HB-co-32.9 mol % 4HB) of Example 10.

Figure 12:
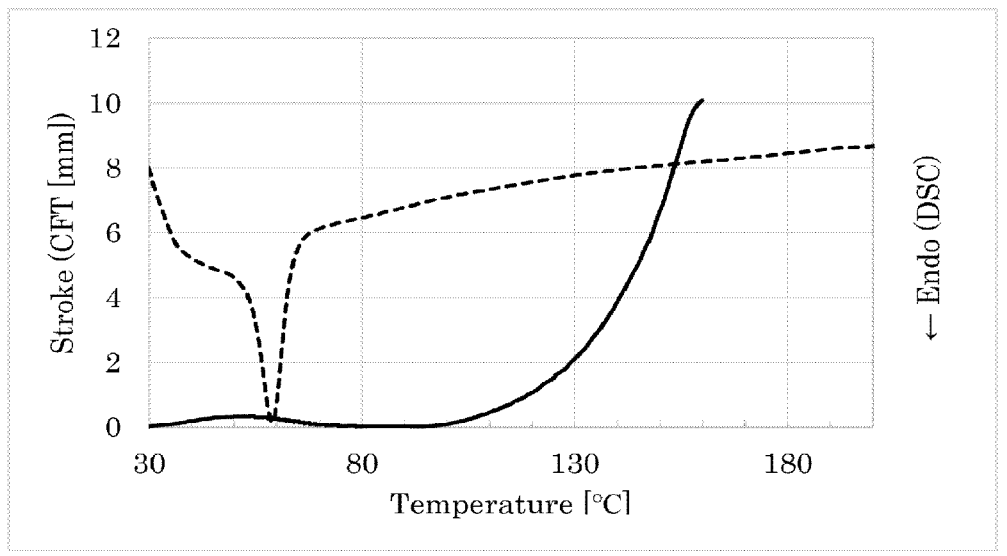

FIG. 12 shows a flow curve (solid line) and a DSC curve (dashed line), according to the flow tester temperature raising method, of Sample S12 (P(3HB-co-74.6 mol % 4HB) of Comparative Example 2.

Figure 13:
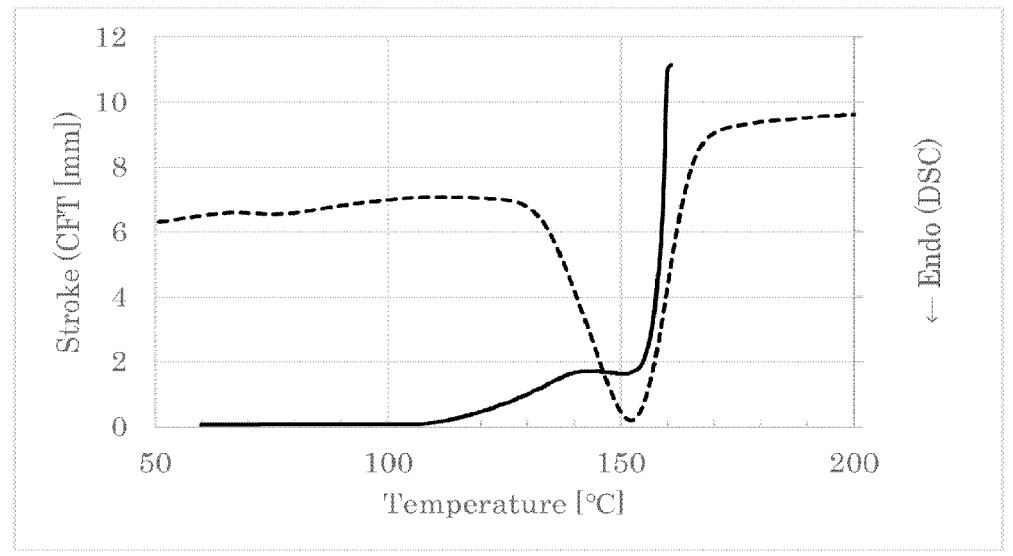

FIG. 13 shows a flow curve (solid line) and a DSC curve (dashed line), according to the flow tester temperature raising method, of Sample S13 (P(3HB-co-8.0 mol % 3HV) of Example 24.

Figure 14:
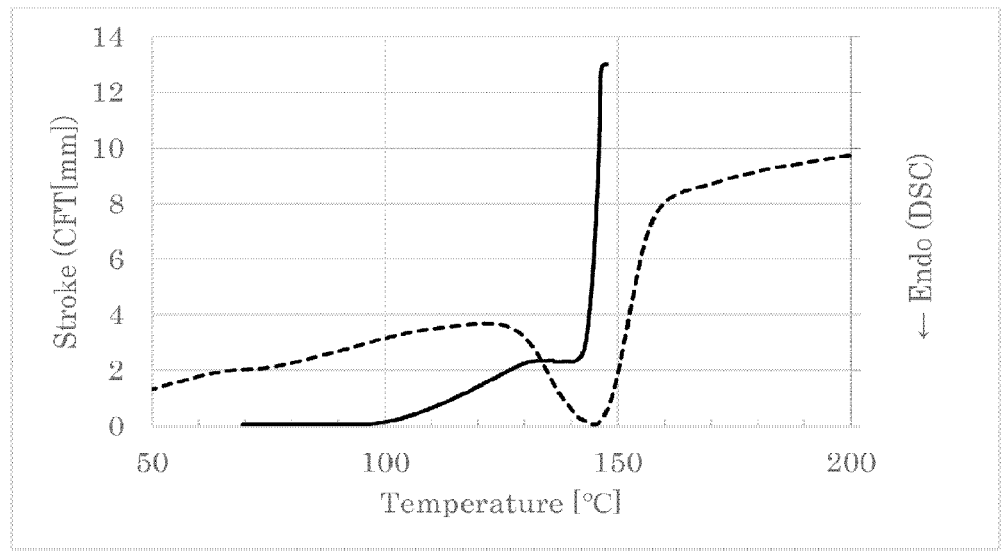

FIG. 14 shows a flow curve (solid line) and a DSC curve (dashed line), according to the flow tester temperature raising method, of Sample S14 (P(3HB-co-12.0 mol % 3HV) of Example 25.

Figure 15:
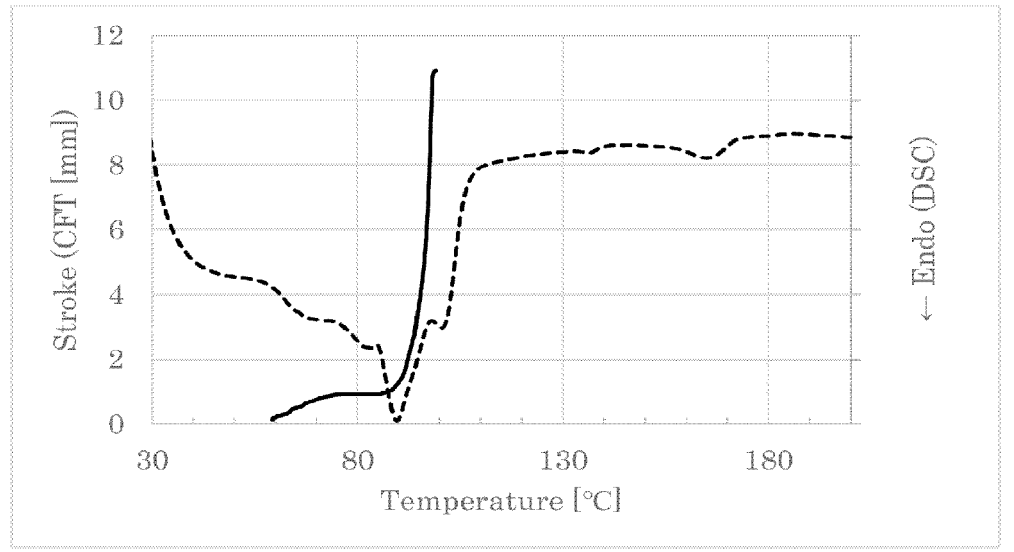

FIG. 15 shows a flow curve (solid line) and a DSC curve (dashed line), according to the flow tester temperature raising method, of Sample S15 (P(3HB-co-35.5 mol % 3HV) of Example 26.

Figure 16:
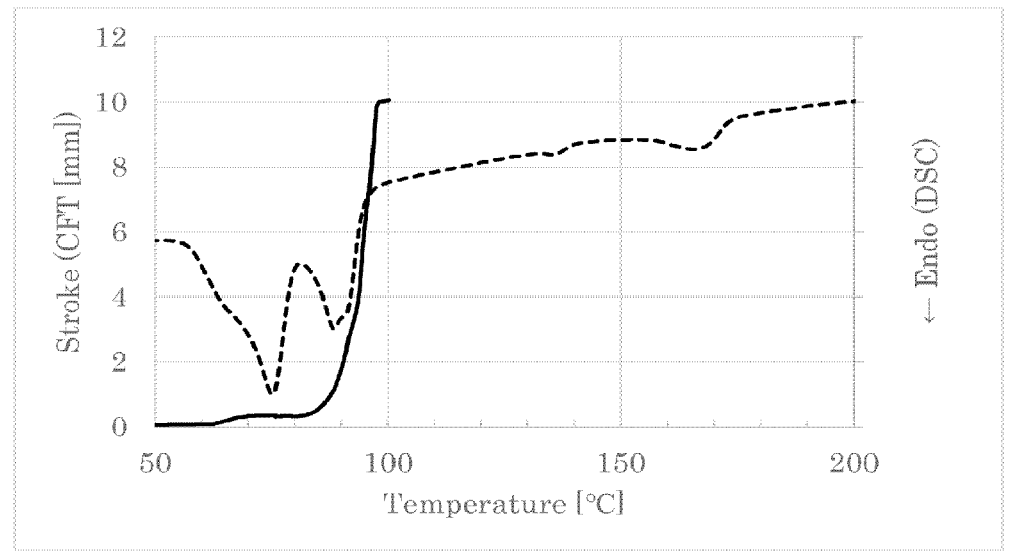

FIG. 16 shows a flow curve (solid line) and a DSC curve (dashed line), according to the flow tester temperature raising method, of Sample S16 (P(3HB-co-48.2 mol % 3HV) of Example 27.

Figure 17:
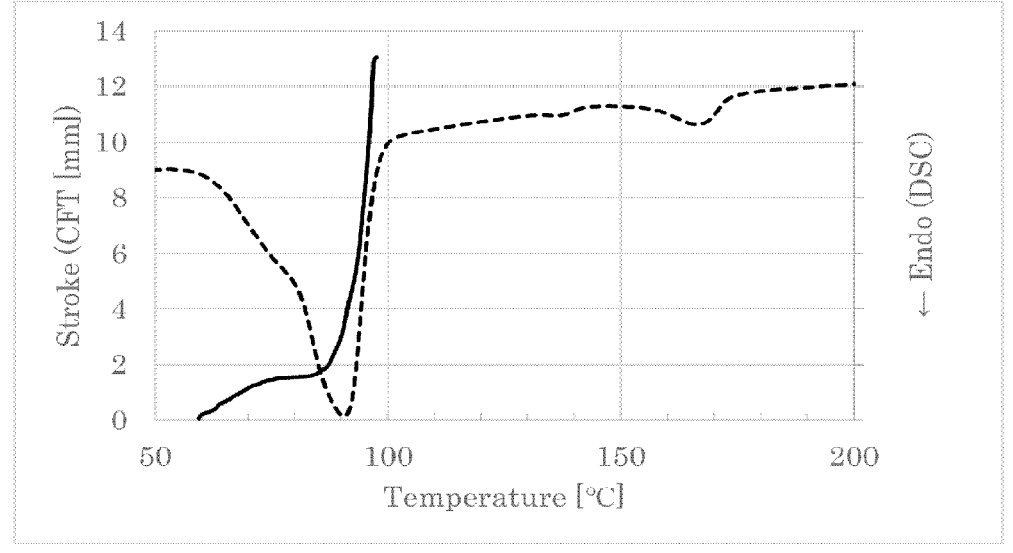

FIG. 17 shows a flow curve (solid line) and a DSC curve (dashed line), according to the flow tester temperature raising method, of Sample S17 (P(3HB-co-61.5 mol % 3HV) of Example 28.

Figure 18:
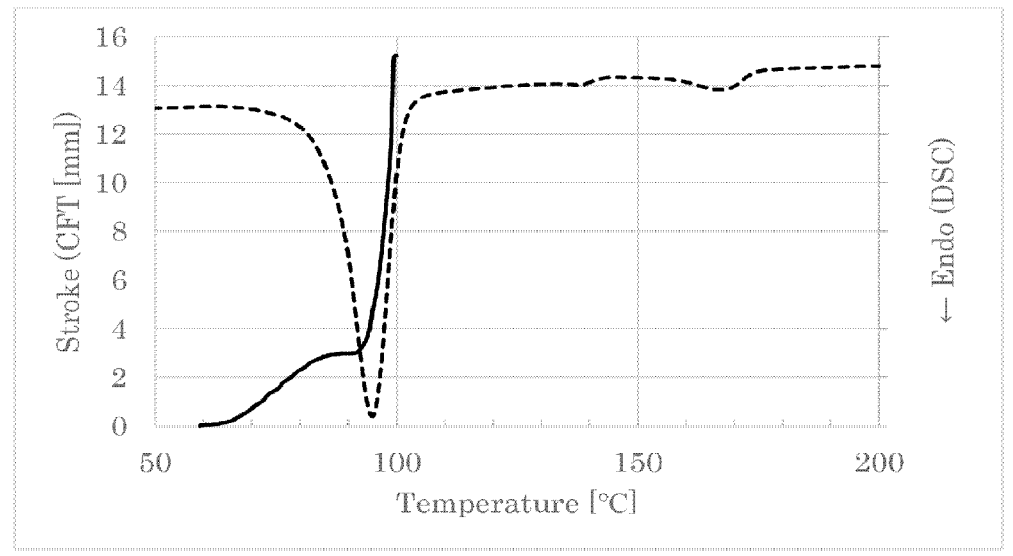

FIG. 18 shows a flow curve (solid line) and a DSC curve (dashed line), according to the flow tester temperature raising method, of Sample S18 (P(3HB-co-73.2 mol % 3HV) of Example 29.

Figure 19:
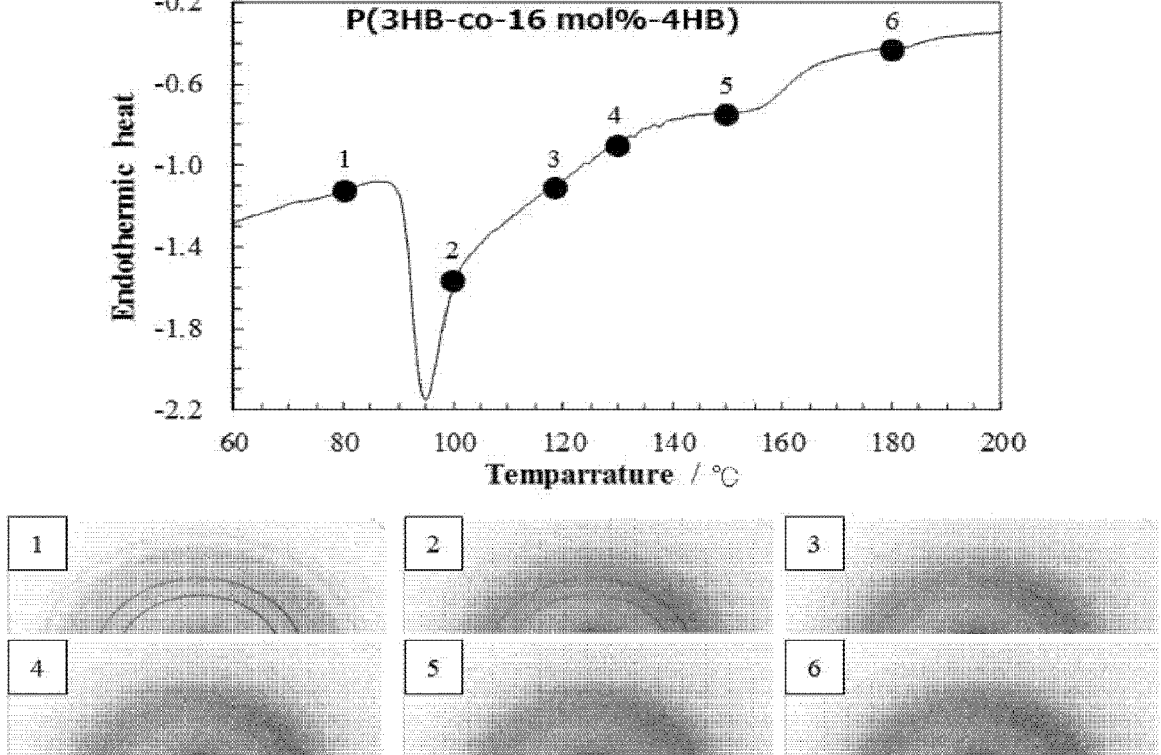

FIG. 19 shows a DSC measurement result and a wide angle X-ray diffraction diagram of Sample S7 (P(3HB-co-16 mol % 4HB) of Reference Example 1 and Examples 6, 22, and 23.

Figure 20:
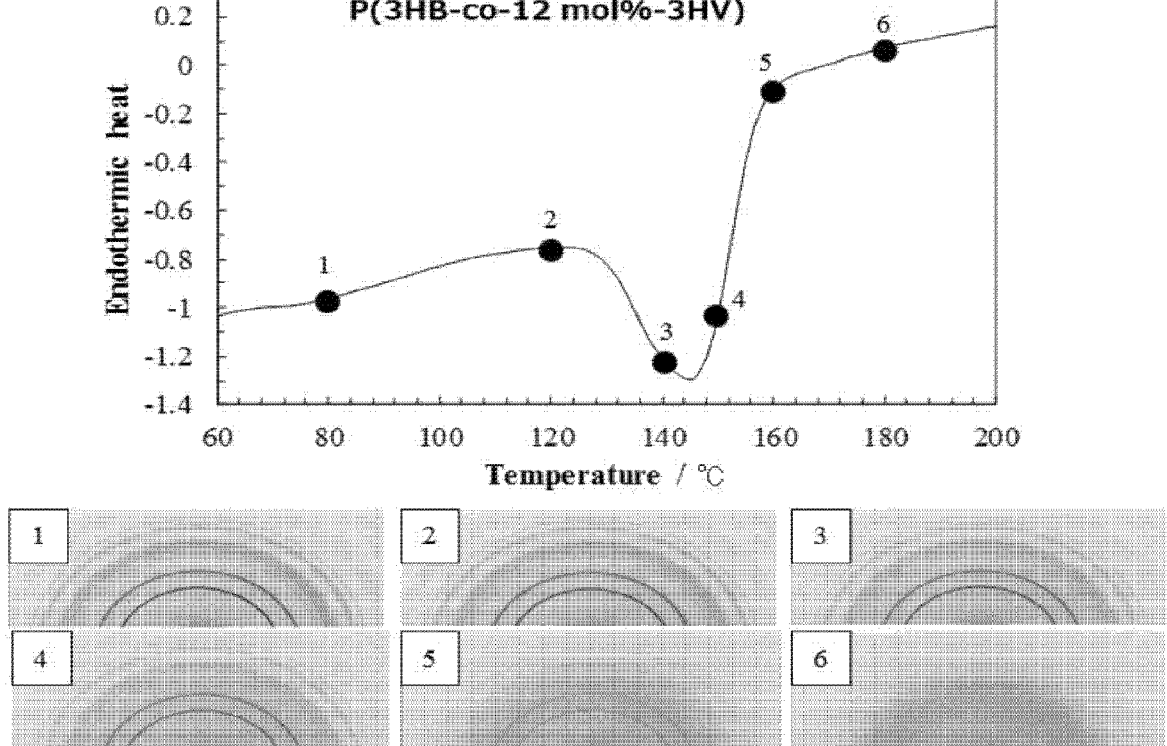

FIG. 20 shows a DSC measurement result and a wide angle X-ray diffraction diagram of Sample S14 (P(3HB-co-12 mol % 3HV) of Reference Example 2, Examples 25, 31, 32, and 33, and Comparative Example 13.

Figure 21:
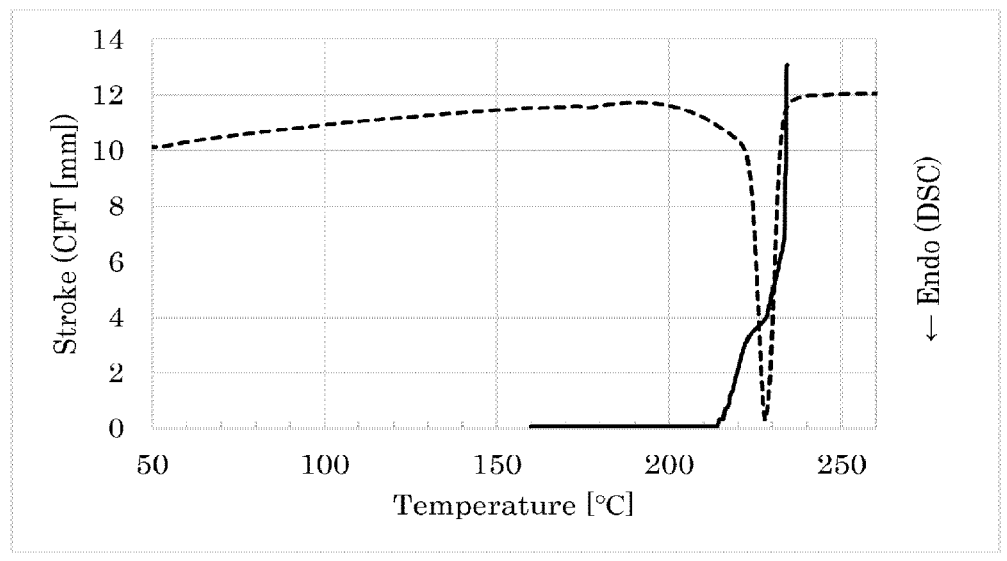

FIG. 21 shows a flow curve (solid line) and a DSC curve (dashed line), according to the flow tester temperature raising method, of Sample S19 (PGA) of Comparative Example 14.

Figure 22:
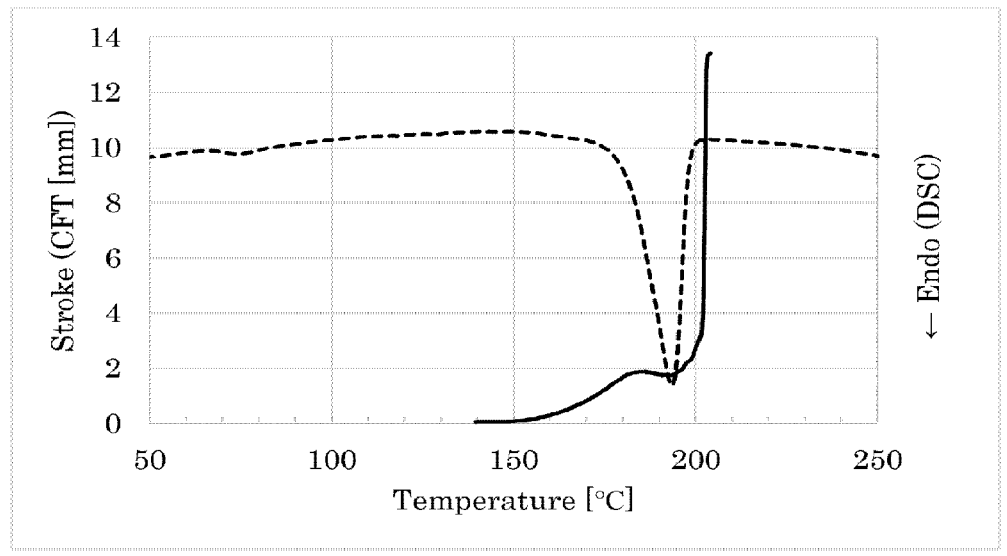

FIG. 22 shows a flow curve (solid line) and a DSC curve (dashed line), according to the flow tester temperature raising method, of Sample S20 (PLLA) of Example 34.

Figure 23:
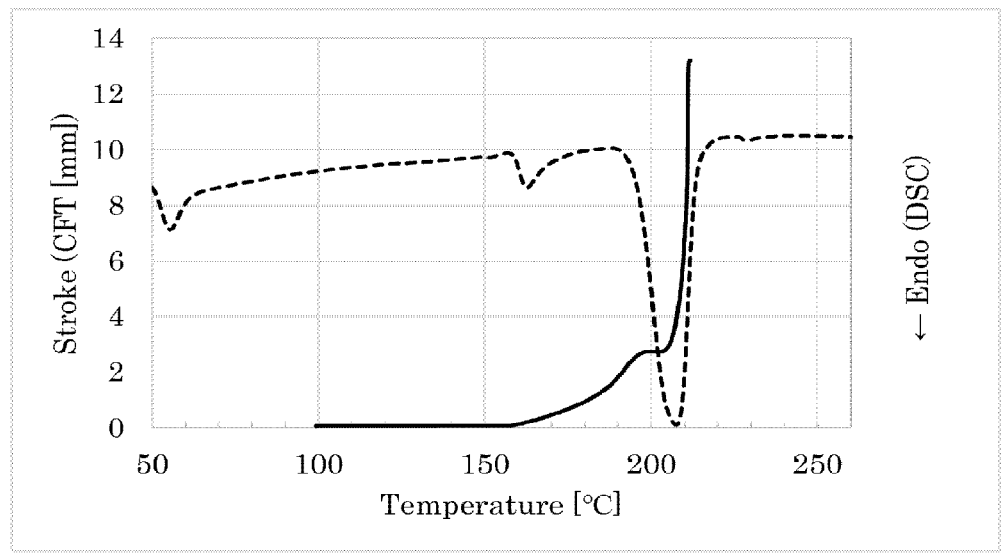

FIG. 23 shows a flow curve (solid line) and a DSC curve (dashed line), according to the flow tester temperature raising method, of Sample S21 (PGLA) of Example 35.

Figure 24:
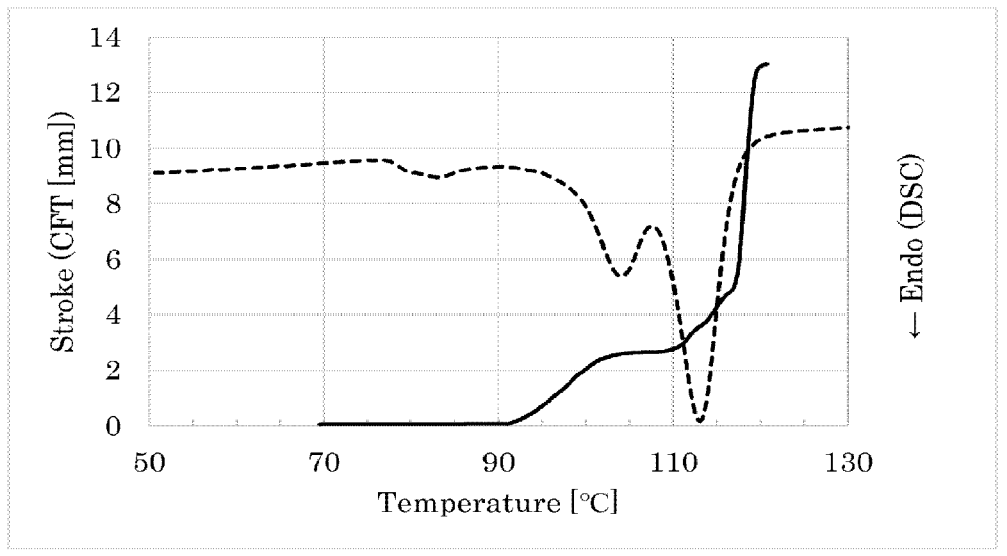

FIG. 24 shows a flow curve (solid line) and a DSC curve (dashed line), according to the flow tester temperature raising method, of Sample S22 (PPDO) of Example 36.

Figure 25:
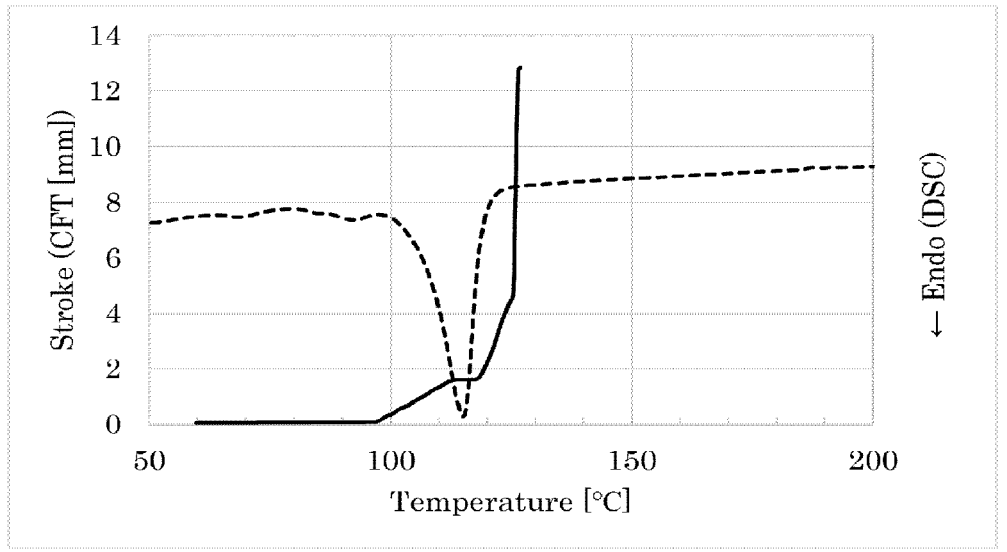

FIG. 25 shows a flow curve (solid line) and a DSC curve (dashed line), according to the flow tester temperature raising method, of Sample S23 (PBS) of Example 37.

Figure 26:
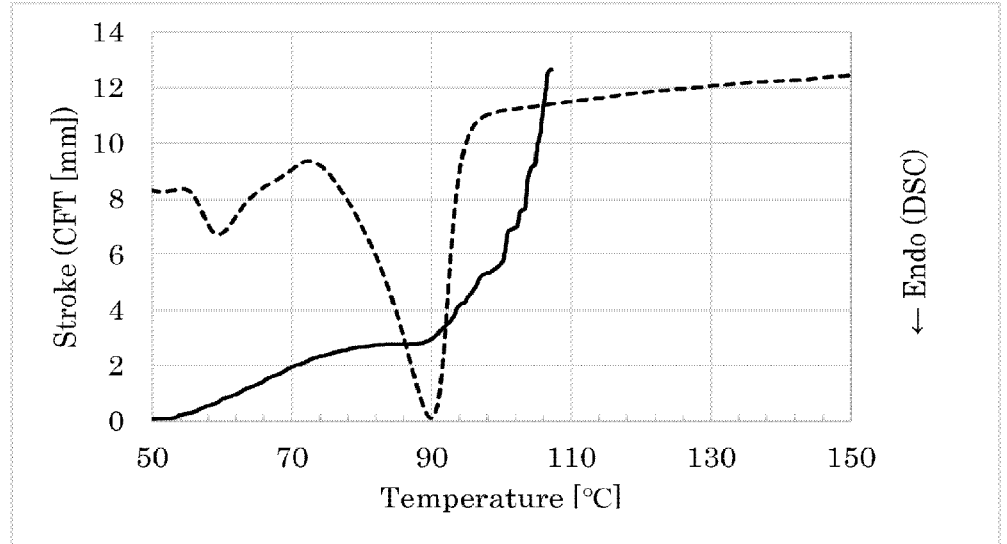

FIG. 26 shows a flow curve (solid line) and a DSC curve (dashed line), according to the flow tester temperature raising method, of Sample S24 (PBSA) of Example 38.

Figure 27:
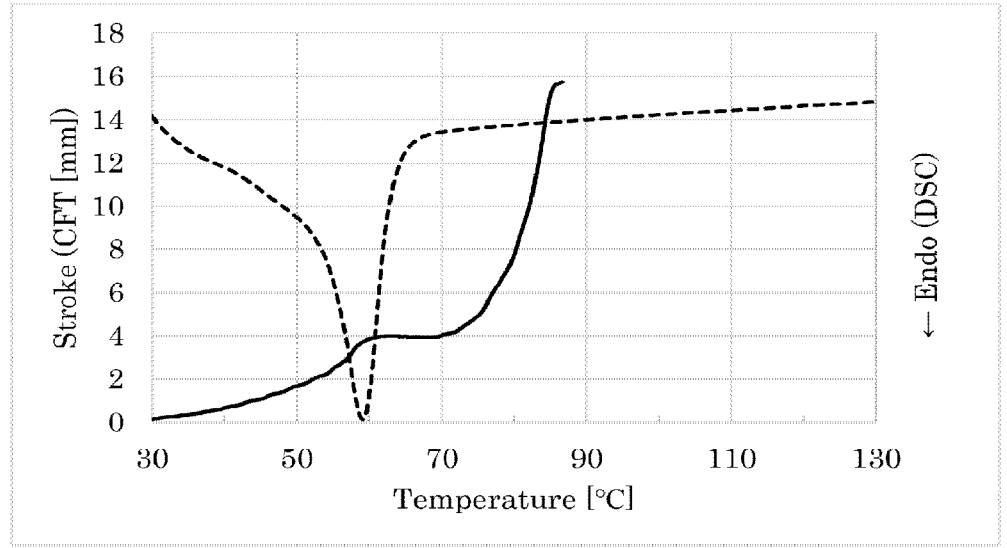

FIG. 27 shows a flow curve (solid line) and a DSC curve (dashed line), according to the flow tester temperature raising method, of Sample S25 (PCL) of Comparative Example 15.

DETAILED DESCRIPTION OF THE INVENTION

The present invention will be described in detail below.

The method for producing a polymeric molded product according to the present invention comprises melt-molding a polymer containing lamellar crystals that are different in lamella thickness, in a temperature range where some of the lamellar crystals undergo melting and flowing, and the other balance lamellar crystals remain unmelted.

In the present invention, a polymer is melted in a temperature range which is not lower than an outflow onset temperature, the outflow onset temperature being measured when flowability of a crystalline thermoplastic resin is evaluated using a flow tester, and which is lower than a temperature indicating completion of crystal melting determined by a differential scanning calorimeter (DSC); the melted polymer is then molded; and thus processability of a slow-crystallizing thermoplastic resin having poor processing properties can be improved.

The "temperature indicating completion of crystal melting determined by a differential scanning calorimeter (DSC)" is preferably an extrapolated melting offset temperature of a melting peak. The extrapolated melting offset temperature of a melting peak can be determined as will be described in the Examples below. That is, when the melting peak is sharp, in accordance with JIS-K7121, the extrapolated melting offset temperature of the melting peak is a temperature at an intersection between a tangent line drawn at a point of maximum slope before the peak end and a baseline after the peak (as recognized by Thermo plus EVO software, Rigaku). When a plurality of melting peak shapes overlap, the tangent line is redrawn manually for the peak on a higher temperature side, and a point of intersection with the baseline is set as the extrapolated melting offset temperature.

Furthermore, typical melt-molding generally comprises melting at a temperature not lower than a melting point, such as a melting point+20° C., a melting point+10° C. or a melting point+5° C., followed by molding. In contrast, when a polymer is molded in a partially melted state in accordance with the present invention, because the polymer is partially melted at a temperature lower than the melting point, in a case where the polymer has a melting point and a heat decomposition point close to each other, it is possible to suppress decomposition due to heat, that is, a reduction in molecular weight of the polymer after molding, and to maintain the high molecular weight of the polymer after molding. Thus, this is more beneficial also in terms of physical properties. Furthermore, the melting in a partially melted state is performed at a temperature lower than that in complete melting, and thus it is inferred that not only the thermal decomposition of the polymer, but also the hydrolysis of the molecular chain of the polymer in which a minor amount of moisture mixed therein is involved in a heated state can be reduced. Therefore, it is generally desirable that a moisture content of a raw material be low, but the need to reduce and maintain the amount of water to attain a particularly low concentration is lessened. Thus, it is also expected that a special device for strictly maintaining a dry state of a dry raw material polymer, preventing moisture in the atmosphere from entering the raw material polymer in spinning or molding equipment, is not necessary.

Although the present invention improves the mold processability of polyester that slowly melts and crystallizes, and enhances productivity without adding a crystal nucleating agent, the present invention does not prevent the use of the crystal nucleating agent.

As an example of the present invention, P(3HB-co-4HB) can be used as the polymer. In this case, the method of the present invention is characterized by comprising a step of melt extruding P(3HB-co-4HB) during melting thereof, at a temperature ranging from a temperature at which crystals comprising relatively thin lamellar crystals comprising a 3HB segment inside the polymer and an amorphous region start to melt and flow, to a temperature at which relatively thick lamellar crystals comprising a 3HB segment melt.

The present invention relates to a method for producing a biodegradable polyester molded product, characterized in that melt-molding is performed while a part of crystals comprising lamellar crystals contained in a polyester copolymer (particularly, a PHA copolymer) remains, the remaining unmelted crystals serve as crystal nuclei, and thus molding can be performed without waiting for primary nucleation in common melt-molding.

Therefore, the method improves poor mold processability of a crystalline thermoplastic polymer that slowly crystallizes, can perform molding immediately after partial melting without waiting for crystal primary nucleation, unlike in the case of complete melting, and improves productivity.

Since some of crystals including lamellar crystals that are already dispersed in bulk of the crystalline thermoplastic polymer remain unmelted and act as crystal nuclei; a waiting time for primary nucleation is not required, and tackiness resulting from low crystallinity immediately after melt extrusion is also reduced; and molded bodies such as fibers and films are less likely to agglutinate, and can be wound and stretched immediately after melt spinning and immediately after film formation, improving productivity.

By melt spinning in a state where some of the crystals remain unmelted, and stretching immediately thereafter, the unmelted lamellar crystals are oriented, and the amorphous polymer chains are highly oriented. Monomer unit continuous segments which easily form crystals gather to promote crystallization. Melting at high temperatures that causes thermal decomposition is not performed, and thus the reduction in molecular weight due to thermal decomposition is suppressed. Thus, the molecular weight of the molded product is maintained, that is, deterioration due to heat is prevented. Furthermore, even if the polymer contains residual moisture or easily absorbs moisture in air, the melting temperature can be reduced by partial melt-molding. Therefore, a degree of hydrolysis in which heat and moisture are involved can also be reduced compared to that in a case of complete melt-molding, the reduction in molecular weight of the polymer can be reduced, and the molecular weight of the molded product can be maintained.

[Polymer]

The polymer is not particularly limited, and, for example, the following polymers can be used. One of these polymers can be used alone, or two or more thereof can be used in combination.

polyester;

polyamide;

polyolefin;

acid-modified polyolefins (such as maleic anhydride grafted polyethylene and maleic anhydride grafted polypropylene);

ethylene-vinyl compound copolymers (ethylene-vinyl acetate copolymers, ethylene-vinyl alcohol copolymers, ethylene-vinyl chloride copolymers, ethylene-(meth)acrylic acid copolymers, ion crosslinked products thereof (ionomer), and ethylene-methyl methacrylate copolymers);

styrene-based resins (such as polystyrene, acrylonitrile-styrene copolymers, and α-methylstyrene-styrene copolymers);

polyvinyl compounds (such as methyl polyacrylate and polymethyl methacrylate);

polycarbonates; polyethers (such as polyethylene oxide).

Among the above polymers, polyesters, polyolefins, or polyamides are preferable. Polyesters, polyolefins, or polyamides will be described below.

<Polyester>

As examples of the polyesters, those comprising hydroxycarboxylic acids and ester-forming derivatives thereof;

those comprising one or more selected from polyvalent carboxylic acids including dicarboxylic acids and ester-forming derivatives thereof and one or more selected from polyhydric alcohols containing glycol;

those comprising cyclic esters;

or the like are exemplified.

Aliphatic polyesters are preferable as those comprising hydroxycarboxylic acids and ester-forming derivatives thereof.

The aliphatic polyesters include homopolymers of aliphatic hydroxycarboxylic acids (for example, poly 3-hydroxypropionic acid, poly 3-hydroxybutyric acid, poly 3-hydroxyvaleric acid, poly 4-hydroxybutyric acid, poly 3-hydroxyhexanoic acid, poly 3-hydroxyoctanoic acid, poly 4-hydroxyvaleric acid, poly 4-hydroxyhexanoic acid, poly 5-hydroxyvaleric acid, poly 2-hydroxybutyric acid, poly 2-hydroxyvaleric acid, poly 2-hydroxyhexanoic acid, polylactic acid, polyglycolic acid, polycaprolactone, etc.), copolymers (e.g., copolymer of 3-hydroxypropionic acid and 3-hydroxybutyric acid, copolymer of 3-hydroxypropionic acid and 3-hydroxyvaleric acid, copolymer of 3-hydroxypropionic acid and 4-hydroxybutyric acid, copolymer of 3-hydroxypropionic acid and 3-hydroxyhexanoic acid, copolymer of 3-hydroxypropionic acid and 3-hydroxyoctanoic acid, copolymer of 3-hydroxybutyric acid and 3-hydroxyvaleric acid, copolymer of 3-hydroxybutyric acid and 4-hydroxybutyric acid, copolymer of 3-hydroxybutyric acid and 3-hydroxyhexanoic acid, copolymer of 3-hydroxybutyric acid and 3-hydroxyoctanoic acid, copolymer of 3-hydroxyvaleric acid and 4-hydroxybutyric acid, copolymer of 3-hydroxyvaleric acid and 3-hydroxyhexanoic acid, copolymer of 3-hydroxyvaleric acid and 3-hydroxyoctanoic acid, copolymer of lactic acid and glycolic acid, copolymer of lactic acid and ε-caprolactone copolymer, copolymer of lactic acid and 3-hydroxypropionic acid, copolymer of lactic acid and 3-hydroxybutyric acid, copolymer of lactic acid and 3-hydroxyvaleric acid, copolymer of lactic acid and 3-hydroxybutyric acid, copolymer of lactic acid and 3-hydroxyhexanoic acid, copolymer of lactic acid and 3-hydroxyoctanoic acid, copolymer of glycolic acid and ε-caprolactone, copolymer of glycolic acid and 3-hydroxypropionic acid, copolymer of glycolic acid and 3-hydroxybutyric acid, copolymer of glycolic acid and 3-hydroxyvaleric acid, copolymer of glycolic acid and 4-hydroxybutyric acid, copolymer of glycolic acid and 3-hydroxyhexanoic acid, copolymer of glycolic acid and 3-hydroxyoctanoic acid, copolymer of ε-caprolactone and 3-hydroxypropionic acid, copolymer of ε-caprolactone and 3-hydroxybutyric acid, copolymer of ε-caprolactone and 3-hydroxyvaleric acid, copolymer of ε-caprolactone and 4-hydroxybutyric acid, copolymer of ε-caprolactone and 3-hydroxyhexanoic acid, copolymer of ε-caprolactone and 3-hydroxyoctanoic acid), and copolymers including three or more monomers such as terpolymers, homopolymers (e.g., polybutylene succinate) and copolymers (e.g., copolymers of butanediol, and succinic acid and adipic acid) of aliphatic polyhydric alcohol carboxylic acids, copolymers including aliphatic hydroxycarboxylic acids, and aliphatic polyhydric alcohols and aliphatic polyvalent carboxylic acids (e.g., block copolymers of polylactic acid and polybutylene succinate), copolymers containing polydioxanone or dioxanone, and mixtures thereof.

In the polymer handled in the present invention, in order to form a polymer structure of a crystalline segment such as a lamellar crystal, a fringed micelle structure, a spherulite, a dendrite, a shish-kebab structure, or an extended chain crystal, it is desirable that a highly crystalline continuous monomer unit chain, for example, a chain of lactic acid, a chain of glycolic acid, a chain of ε-caprolactone, a chain of 3-hydroxypropionic acid, a chain of 3-hydroxybutyric acid, a chain of 3-hydroxyvaleric acid, a chain of 4-hydroxybutyric acid, a chain of 3-hydroxyhexanoic acid, a chain of 3-hydroxyhexanoic acid, a chain of 3-hydroxyoctanoic acid, a chain of 4-hydroxyvaleric acid, a chain of 4-hydroxyhexanoic acid, a chain of 5-hydroxyvaleric acid, a chain of 2-hydroxybutyric acid, a chain of 2-hydroxyvaleric acid, a chain of 2-hydroxyhexanoic acid, a chain of butylene succinate, or a chain of butylene succinate adipate, which is a chain structure sufficient to form a crystalline microstructure, should be repeatedly present in the polymer chain. When a stereoisomer or optical isomer is present for a monomer unit, a crystalline segment including a chain made of the same stereoisomer is required. For construction of the crystalline structure, the chain structure made of the identical stereoisomer such as a chain structure of the same stereoisomer such as a chain of L-lactic acid chain, a chain of D-lactic acid, a chain of R-3-hydroxybutyric acid, a chain of S-3-hydroxybutyric acid, a chain of R-3-hydroxyvaleric acid, a chain of S-3-hydroxyvaleric acid, a chain of R-3-hydroxyhexanoic acid, or a chain of S-3-hydroxyhexanoic acid, is an important element. In a case of polyesters including monomer units in which stereoisomers or optical isomers are present, crystallinity decreases and crystalline segments are less likely to be formed. Particularly, in a case of biologically synthesizing a polymer including these monomer units, a two-component copolymer or three or more-component copolymer having a chain of R-3-hydroxybutyric acid and any other monomer unit incorporated therein as a second component is more preferable.

The aliphatic polyester may be produced by either a chemical synthesis method or a biosynthesis method. In order to secure the crystalline segment comprising the chain structure, when containing a monomer unit with a stereoisomer, the aliphatic polyester is desirably a copolymer comprising one of the stereoisomers, such as a copolymer of L-lactic acid and glycolic acid, a copolymer of D-lactic acid and glycolic acid, a copolymer of R-3-hydroxybutyric acid and 4-hydroxybutyric acid, a copolymer of S-3-hydroxybutyric acid and 4-hydroxybutyric acid, a copolymer of R-3-hydroxybutyric acid and ε-caprolactone, or a copolymer of S-3-hydroxybutyric acid and ε-caprolactone.

When the polyester comprises a 3-hydroxybutyric acid unit and a 4-hydroxybutyric acid unit, a proportion of the 4-hydroxybutyric acid unit relative to all monomer units is preferably 5 mol % or greater and 40 mol % or less. A proportion of the 4-hydroxybutyric acid unit relative to all monomer units may be 5 mol % or greater, 6 mol % or greater, 7 mol % or greater, 8 mol % or greater, 9 mol % or greater, 10 mol % or greater, 11 mol % or greater, 12 mol % or greater, 13 mol % or greater, 14 mol % or greater, 15 mol % or greater, or 16 mol % or greater, and may be 17 mol % or greater, 18 mol % or greater, 19 mol % or greater, or 20 mol % or greater. The proportion of the 4-hydroxybutyric acid unit relative to all monomer units may be 35 mol % or less, 34 mol % or less, 33 mol % or less, 32 mol % or less, 31 mol % or less, 30 mol % or less, 29 mol % or less, 28 mol % or less, 27 mol % or less, 26 mol % or less, 25 mol % or less, 24 mol % or less, 23 mol % or less, 22 mol % or less, or 21 mol % or less.

When the polyester comprises a 3-hydroxybutyric acid unit and a 3-hydroxyvaleric acid unit, a proportion of the 3-hydroxyvaleric acid unit relative to all monomer units is preferably 5 mol % or greater and 90 mol % or less. A proportion of the 3-hydroxyvaleric acid unit relative to all monomer units may be 5 mol % or greater, 6 mol % or greater, 7 mol % or greater, 8 mol % or greater, 9 mol % or greater, 10 mol % or greater, 15 mol % or greater, 20 mol % or greater, 25 mol % or greater, 30 mol % or greater, 35 mol % or greater, or 40 mol % or greater, and may be 45 mol % or greater, 50 mol % or greater, 55 mol % or greater, or 60 mol % or greater. A proportion of the 3-hydroxyvaleric acid unit relative to all monomer units may be 90 mol % or less, 85 mol % or less, 80 mol % or less, 75 mol % or less, 70 mol % or less, or 65 mol % or less.

The polyester may include those comprising one or more selected from polyvalent carboxylic acids comprising dicarboxylic acids and ester-forming derivatives thereof and one or more selected from polyhydric alcohols containing glycol.

Specific examples of the dicarboxylic acid include saturated aliphatic dicarboxylic acids exemplified by oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid, dimer acid and the like or ester-forming derivatives thereof; unsaturated aliphatic dicarboxylic acids exemplified by fumaric acid, maleic acid, itaconic acid and the like or ester-forming derivatives thereof, naphthalenedicarboxylic acids exemplified by orthophthalic acid, isophthalic acid, terephthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid and the like; aromatic dicarboxylic acids exemplified by 4,4'-biphenyldicarboxylic acid, 4,4'-biphenylsulfonedicarboxylic acid, 4,4'-biphenyletherdicarboxylic acid, 1,2-bis (phenoxy)ethane-p,p'-dicarboxylic acid, anthracene dicarboxylic acid and the like or ester-forming derivatives thereof, and metal sulfonate group-containing aromatic dicarboxylic acids exemplified by 5-sodium sulfoisophthalic acid, 2-sodium sulfoterephthalic acid, 5-lithium sulfoisophthalic acid, 2-lithium sulfoterephthalic acid, 5-potassium sulfoisophthalic acid, 2-potassium sulfoterephthalic acid and the like or lower alkyl ester derivatives thereof.

Among the dicarboxylic acids indicated above, the use of terephthalic acid, isophthalic acid, or naphthalene dicarboxylic acid is preferable from the perspective of physical properties and the like of the resulting polyester. Note that other dicarboxylic acids may be copolymerized if necessary.

Specific examples of the glycol include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols exemplified by hydroquinone, 4,4'-dihydroxybisphenol, 1,4-bis (β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, glycols obtained by adding ethylene oxide to these glycols and the like.

Specific examples of polyhydric alcohols other than these glycols include trimethylolmethane, trimethylolethane, trimethylolpropane, pentaerythritol, glycerol, and hexane triol.

Specific examples of cyclic esters include ε-caprolactone, β-propiolactone, β-methyl-β-propiolactone, δ-valerolactone, glycolide, and lactide.

Specific examples of the ester-forming derivatives of the polyvalent carboxylic acids and hydroxycarboxylic acids include alkyl esters, acid chlorides, and acid anhydrides thereof.

<Polyolefin>

Examples of the polyolefin used in an oxygen-absorbing composition include polyethylenes such as low-density polyethylene, medium-density polyethylene, high-density polyethylene, linear low-density polyethylene, and linear ultra low-density polyethylene; olefin homopolymers such as polypropylene, polybutene-1, and poly-4-methylpentene-1; copolymers of ethylene and α-olefin such as ethylene-propylene random copolymers, ethylene-propylene block copolymers, ethylene-propylene-polybutene-1 copolymers, and ethylene-cyclic olefin copolymers; ethylene-α,β-unsaturated carboxylic acid copolymers such as ethylene-(meth) acrylate copolymers; ethylene-α,β-unsaturated carboxylic acid ester copolymers such as ethylene-ethyl(meth)acrylate copolymers; ionic crosslinked products of ethylene-α,β-unsaturated carboxylic acid copolymers; other ethylene copolymers such as ethylene-vinyl acetate copolymers; cyclic olefin ring-opening polymers and hydrogenated polymers thereof; cyclic olefin-ethylene copolymers; and graft-modified polyolefins obtained by graft-modifying these polyolefins with an acid anhydride such as maleic anhydride.

<Polyamide>

Examples of the polyamide include a polyamide having a unit derived from a lactam or an aminocarboxylic acid as a main constituent unit, an aliphatic polyamide having a unit derived from an aliphatic diamine and an aliphatic dicarboxylic acid as a main constituent unit, a partially aromatic polyamide having a unit derived from an aliphatic diamine and an aromatic dicarboxylic acid as a main constituent unit, and a partially aromatic polyamide having a unit derived from an aromatic diamine and an aliphatic dicarboxylic acid as a main constituent unit. Note that the polyamide referred to here may be a polyamide in which monomer units other than the main constituent units are copolymerized as necessary.

Specific examples of the lactam or aminocarboxylic acid include lactams such as ε-caprolactam and laurolactam, aminocarboxylic acids such as aminocaproic acid and aminoundecanoic acid, and aromatic aminocarboxylic acids such as para-aminomethylbenzoic acid.

Specific examples of the aliphatic diamine include aliphatic diamines having from 2 to 12 carbon atoms or functional derivatives thereof, and alicyclic diamines. Note that the aliphatic diamine may be a linear aliphatic diamine or a branched chain aliphatic diamine. Specific examples of such linear aliphatic diamines include aliphatic diamines such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine. Specific examples of the alicyclic diamine include cyclohexanediamine, 1,3-bis(aminomethyl)cyclohexane, and 1,4-bis(aminomethyl)cyclohexane.

Specific examples of the aliphatic dicarboxylic acid include linear aliphatic dicarboxylic acids and cycloaliphatic dicarboxylic acids. Among these, a linear aliphatic dicarboxylic acid having an alkylene group having from 4 to 12 carbon atoms is preferable. Examples of the linear aliphatic dicarboxylic acid include adipic acid, sebacic acid, malonic acid, succinic acid, glutaric acid, pimelic acid, suberic acid, azelaic acid, undecanoic acid, undecanedioic acid, dodecanedioic acid, dimer acid, and functional derivatives thereof. Examples of the alicyclic dicarboxylic acid include 1,4-cyclohexanedicarboxylic acid, hexahydroterephthalic acid, and hexahydroisophthalic acid.

Specific examples of the aromatic diamine include meta-xylylenediamine, para-xylylenediamine, and para-bis(2-aminoethyl)benzene.

Specific examples of the aromatic dicarboxylic acid include terephthalic acid, isophthalic acid, phthalic acid, 2,6-naphthalenedicarboxylic acid, diphenyl-4,4'-dicarboxylic acid, diphenoxyethanedicarboxylic acid, and functional derivatives thereof.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, polymetaxylylene adipamide (polyamide MXD6), isophthalic acid copolymerized polymetaxylylene adipamide (polyamide MXD6I), polymetaxylylene sebacamide (polyamide MXD10), polymetaxylylene dodecanamide (polyamide MXD12), poly 1,3-bisaminocyclohexane adipamide (polyamide BAC6), and polyparaxylylene sebacamide (polyamide PXD10). More preferred polyamides include polyamide 6, polyamide MXD6, and polyamide MXD6I.

<Molecular Weight of Polymer>

For the aliphatic hydroxycarboxylate polymer such as polyhydroxyalkanoate, a weight average molecular weight determined by gel permeation chromatography, calibrated with polystyrene, is preferably 100000 or greater, and more preferably 200000 or greater, and, further, may be 300000 or greater, 400000 or greater, or 500000 or greater. The weight average molecular weight determined by gel permeation chromatography, calibrated with polystyrene, may be 600000 or greater, 700000 or greater, 800000 or greater, 900000 or greater, 1000000 or greater, 1100000 or greater, 1200000 or greater, 1300000 or greater, 1400000 or greater, 1500000 or greater, 2000000 or greater, 3000000 or greater, or 4000000 or greater. The upper limit of the weight average molecular weight determined by gel permeation chromatography, calibrated with polystyrene, is not particularly limited and is typically 20000000 or less, 10000000 or less, 8000000 or less, 7000000 or less, 6000000 or less, 5000000 or less, 4000000 or less, or 3000000 or less. However, considering reduction in molecular weight due to pyrolysis and excessively high viscosity at the time of melting, when melt-molding is performed, the weight average molecular weight determined by gel permeation chromatography, calibrated with polystyrene, is preferably 400000 or greater and 2500000 or less, more preferably 500000 or greater and 2200000 or less, and even more preferably 600000 or greater and 2000000 or less.

For the molecular weight of polymers other than the aliphatic hydroxycarboxylate polymer, an appropriate molecular weight can be used as appropriate depending on the type of the polymer.

Preferred Embodiment of Polymer

The polymer of the present invention may be any one selected from a random polymer, a block polymer, an alternating polymer, or a grafted polymer, but is preferably a random polymer.

The polymer preferably contains a thermoplastic resin.

The polymer is more preferably a biodegradable polymer, and even more preferably a bioabsorbable polymer. Biodegradable means that the material can be decomposed by microorganisms or enzymes in the natural environment (e.g., soil, compost, lakes and marshes, and sea water) or decomposed into non-toxic components in vivo. Bioabsorbable means that the material can be metabolized by organisms, such as humans and animals.

The melting point of the polymer is not particularly limited, but is preferably 180° C. or lower, more preferably 175° C. or lower, and even more preferably less than 175°

C. The melting point of the polymer may be 170° C. or lower, 160° C. or lower, 150° C. or lower, 140° C. or lower, or 130° C. or lower. A lower limit on the melting point of the polymer is not particularly limited, but is generally 40° C. or higher, and may be 50° C. or higher, 60° C. or higher, 70° C. or higher, 80° C. or higher, 90° C. or higher, or 100° C. or higher. In a case where the polymer has a plurality of melting points, the melting point of the main component should be within the range described above.

[Melt-Molding]

In the present invention, the polymer described above is melt-molded. When the polymer is melt-molded, additives may be added as long as the effects of the present invention are not impaired.

Examples of the additives include one or more selected from antioxidants, thermal stabilizers (e.g., hindered phenols, hydroquinone, phosphites and substituents thereof), ultraviolet absorbers (e.g., resorcinol, and salicylate), anticolorants (e.g., phosphite and hypophosphite), lubricants, release agents (e.g., montanic acid and metal salts thereof, esters thereof, half esters thereof, stearyl alcohol, stearamide and polyethylene waxes), colorants (e.g., dyes or pigments), carbon black as a conductive or colorant, plasticizers, flame retardants (e.g., bromine-based flame retardant, phosphorus-based flame retardant, red phosphorus, and silicone-based flame retardant), flame retardant aids, and antistatic agents.

A method of formulating an additive to the polymer is not particularly limited, and includes dry blend, solution blending, and addition during polymerization of the polymer.

The polymer can be subjected to known melt-molding such as injection molding, injection compression molding, compression molding, extrusion molding (melt extrusion molding), blow molding, press molding, and spinning (melt extrusion spinning).

The number of times of melt-molding is not particularly limited, but melt-molding can be performed only once.

In the present invention, a step of solidifying after molding can be performed in a molding die, in a gas (e.g., air or nitrogen), or in a liquid (e.g., water, alcohol, glycerin or a mixture thereof). That is, solidification can be performed by cooling the polymer partially melted according to the method of the present invention in a molding die, in a gas or in a liquid. Preferably, the partially melted polymer can be cooled in a molding die, in air or in water. More preferably, the partially melted polymer can be cooled in a molding die or in air.

Examples of a polymeric molded article produced by the method of the present invention include an injection molded article, an extrusion molded article, a press molded article, a sheet, a pipe, an unstretched film, various films such as a uniaxially stretched film and a biaxially stretched film, and various fibers such as an undrawn yarn and a super-drawn yarn. Note that the polymeric molded article produced by the method of the present invention may have a tube shape or may have a shape other than the tube shape.

Hereinafter, the present invention will be described in detail with reference to the following examples, comparative examples, and reference examples. The description of the examples, comparative examples, reference examples, and aspects in the specification of the present application is a description to assist in understanding the details of the present invention, which does not constitute grounds for narrowly interpreting the technical scope of the present invention. The following thermoplastic polymers were used in the following examples and comparative examples.

EXAMPLES

<Polymer Used>

For the poly 3-hydroxybutylate (P(3HB)), "BIOGREEN® (Mw: 940000)" available from Mitsubishi Gas Chemical Company, Inc was used.

The P(3HB-co-4HB) copolymer was produced by a culture method according to the method described in WO 2019/044837. P(3HB-co-4HB) copolymers having various 4HB ratios were produced by appropriately changing the type and feed proportion of the carbon source to be used.

Biopol (8.0 mol % 3HV product and 12.0 mol % 3HV product) available from ICI was used as the P(3HB-co-3HV) copolymer, and a 3HV-rich P (3HB-co-3HV) copolymer was produced by a culture method according to the methods described in JP 04-084890 A and JP 01-069622 A.

The polyglycolic acid (PGA) used was "PGA (MFR (240, 10)=0.5-5.0 g/10 min)" available from BMG Inc.; the poly-L-lactic acid (PLLA) used was "PLLA (Mw 470000)" available from BMG Inc.; and the polycaprolactone (PCL) used was "Capa 6800 (Mw 80000)" available from Ingevity Corporation.

The copolymer of glycolic acid and L-lactic acid used was "PGLA (90:10) (88.5 mol % of glycolic acid: 11.5 mol % of L-lactic acid, MFR (240, 10)=2.75)" available from BMG Inc.

The poly-p-dioxanone (PPDO) used was "PPDO" available from BMG Inc.

The polybutylene succinate (PBS) used was "BioPBS® FZ91P (MFR 190, 10)=5 g/10 min)" available from Mitsubishi Chemical Corporation, and the polybutylene succinate adipate used was "BioPBS® FD92PB (MFR 190, 10)=4 g/10 min)".

As the method for extraction of PHA from a bacterial cell, a solvent extraction method of extracting PHA with a halogenated hydrocarbon solvent such as chloroform and precipitating it with a poor solvent such as hexane or methanol may be used as known, or a water-based extraction method may be used as described in JP 04-061638 A, JP 07-177894 A, and WO 2004/029266.

Various evaluation methods and melt extrusion methods for analyzing a thermoplastic polymer will be described.

(1) Measurement of Molecular Weight of Thermoplastic Polymer

[PHA Molecular Weight Measurement (Gel Permeation Chromatography (GPC) Method)]

The PHA molecular weight measurement was performed by gel permeation chromatography method as described below.

PHA was adjusted to approximately 0.5 mg/mL by adding chloroform and dissolved at 60° C. for 4 hours, and cooled to room temperature. Insoluble substances were filtered and removed by using a PTFE filter having a pore diameter of 0.2 μm to obtain a measurement sample. Conditions for GPC are as shown below.

Instrument: HPLC Prominence system, available from Shimadzu Corporation

Column: Shodex K-806L (two columns in series), available from Showa Denko K.K.

Column temperature: 40° C.

Mobile phase: Chloroform (1 mL/min)

Detector: RI (40° C.)

Standards: Shodex polystyrene molecular weight standards (6870000 to 1270)

Injection amount: 60 μL

Analysis time: 30 minutes (2) Measurement of Outflow Onset Temperature of Thermoplastic Polymer

[Measurement of Outflow Onset Temperature of Thermoplastic Polymer by Flow Tester]

The thermoplastic polymer is subjected to measurement using a flow tester CFT-500D (Capillary Rheometer Flowtester available from Shimadzu Corporation) or CFT-500EX available from Shimadzu Corporation). The sample amount used for measurement is approximately 1.2 g of a thermoplastic polymer having a pellet shape, a powder shape, a film shape, or the like, and was measured by filling the sample in a cylinder. When a powdery polymer is used, the polymer may be molded using an appropriate granulator or press machine and filled in the cylinder. A die (nozzle) having a diameter of 1.0 mm and a thickness of 1.0 mm is used. An extrusion load of 5 kg is applied, preheating is performed for 240 seconds at an initial set temperature of from 30° C. to 140° C. (appropriately selected depending on the type and melting point of the polymer), and then the temperature is the melting peak was a temperature at an intersection between a tangent line drawn at a point of maximum slope before peak end and a baseline after the peak (recognized by Thermo plus EVO software, Rigaku). When a plurality of melting peak shapes overlapped, the tangent line was redrawn manually for the peak on a higher temperature side, and a point of intersection with the baseline was set as the extrapolated melting offset temperature.

(4) Partial Melt Extrusion and Melt Extrusion of Thermoplastic Polymer

[Melt Spinning at Constant Temperature Using Flow Tester]

Melt extrusion spinning was performed using a flow tester CFT-500D (available from Shimadzu Corporation) or CFT-500EX available from Shimadzu Corporation).

<Various Analysis Results>

Measurement results of DSC and CFT (Capillary Flowtester) of 4HB-containing PHA copolymers are shown in Table 1 below.

TABLE 1

Figure 1:
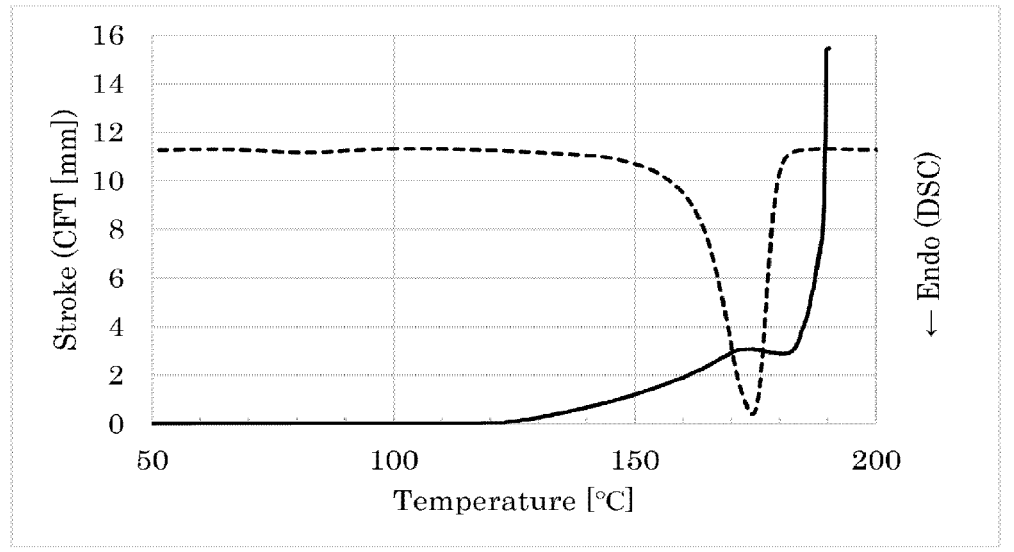
FIG. 1 shows a flow curve (solid line) and a DSC curve (dashed line), according to a flow tester temperature raising method, of Sample S1 (P(3HB) homopolymer) of Comparative Example 1.
Figure 2:
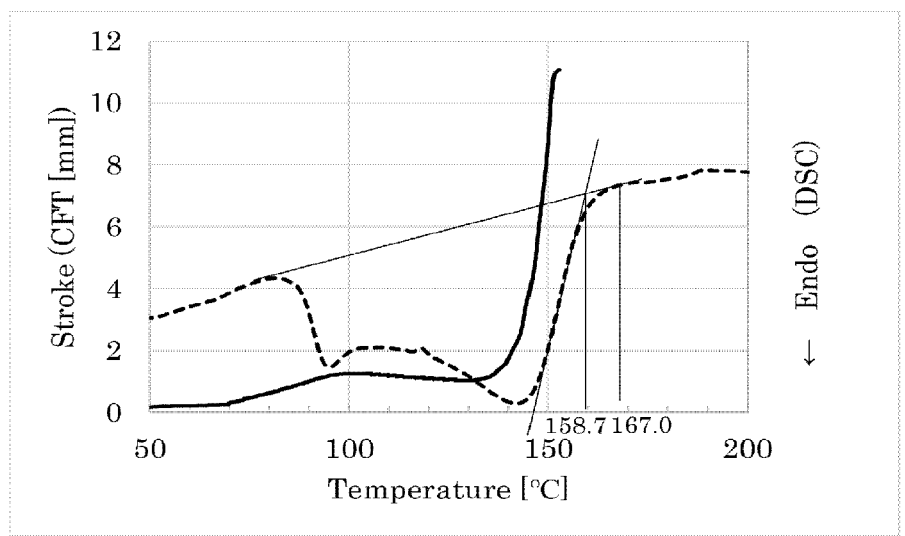
FIG. 2 shows a flow curve (solid line) and a DSC curve (dashed line), according to the flow tester temperature raising method, of Sample S2 (P(3HB-co-11.8 mol % 4HB)

| | Sample No. | Example Comparative Example | Composition | CFT outflow onset temperature [° C.] | Extrapolated melting offset temperature of DSC 1st heating peaks [° C.] | Baseline arrival temperature at DSC 1st heating peaks [° C.] | Whether partial melt extrusion is possible or not | Partially-melt extrudable temperature [° C.] |
|---|---|---|---|---|---|---|---|---|
| | Partial melt spinning and heating state change behavior of 4HB-containing PHA copolymer |
| FIG. 1 | S1 | Comparative Example 1 | 3HB 100 mol % | 181.0 | 179.7 | 188.7 | Not possible | — |
| FIG. 2 | S2 | Example 1 | 4HB 11.8 mol % | 131.3 | 158.7 | 167.0 | Possible | 131.3 to 158.7 |
| FIG. 3 | S3 | Example 2 | 4HB 13.1 mol % | 125.1 | 135.1 | 155.0 | Possible | 125.1 to 135.1 |
| FIG. 4 | S4 | Example 3 | 4HB 14.7 mol % | 113.9 | 140.9 | 144.7 | Possible | 113.9 to 140.9 |
| FIG. 5 | S5 | Example 4 | 4HB 15.3 mol % | 109.4 | 130.2 168.9 | 172.6 | Possible | 109.4 to 168.9 |
| FIG. 6 | S6 | Example 5 | 4HB 15.3 mol % | 113.8 | 145.6 | 161.1 | Possible | 113.8 to 145.6 |
| FIG. 7 | S7 | Example 6 | 4HB 16.0 mol % | 94.0 | 105.8, 175.9 | 178.2 | Possible | 94.0 to 175.9 |
| FIG. 8 | S8 | Example 7 | 4HB 17.8 mol % | 96.2 | 107.3, 175.6 | 177.6 | Possible | 96.2 to 175.6 |
| FIG. 9 | S9 | Example 8 | 4HB 17.9 inol % | 131.3 | 146.0 | 151.7 | Possible | 131.3 to 146.0 |
| FIG. 10 | S10 | Example 9 | 4HB 28.7 mol % | 109.5 | 55.9, 166.7 | 170.3 | Possible | 109.5 to 166.7 |
| FIG. 11 | S11 | Example 10 | 4HB 32.9 mol % | 123.1 | 55.9, 88.1, 144.7 | 151.4 | Possible | 123.1 to 144.7 |
| FIG. 12 | S12 | Comparative Example 2 | 4HB 74.6 mol % | 94.6 | 64.1 | 72.1 | Not possible | — | raised to a range from 130 to 260° C. (appropriately selected depending on the type and melting point of the polymer) at a constant rate of 3° C./min. The curves for the stoke length (mm) and the temperature for this process are determined. As the temperature is increased, the thermoplastic polymer is heated, and the polymer starts to flow out of the die. The temperature at this time is defined as outflow onset temperature.

(3) Measurement of Melting Behavior of Thermoplastic Polymer

[Measurement of Thermal Nature by Differential Scanning Calorimeter (DSC)]

The melting behavior of thermoplastic polymers, including polyhydroxyalkanoates, was measured using a differential scanning calorimeter (Rigaku, Thermo plus EVO DSC8230). The measurement atmosphere was nitrogen (30 ml/min), and the temperature was raised from 30° C. to a range from 130 to 260° C. (appropriately selected from the type and melting point of the polymer) at 20° C./min. The amount of the sample was approximately 1 mg, and an aluminum sample pan was used. Indium was used for temperature calibration.

When the melting peak was sharp, in accordance with JIS-K7121, the extrapolated melting offset temperature of Comparative Example 1

Sample S1

P(3HB) having a Mw of 940000 (Sample S1) was analyzed by a flow tester (CFT) and DSC. The CFT outflow onset temperature was 181.0° C., and the width of the crystal melting peak by DSC was approximately from 140 to 189° C. The crystal melting peak apex was 175.0° C., the DSC extrapolated melting offset temperature was 179.7° C., and the temperature at which the melting point peak reached the baseline was 188.7° C. It was found that the DSC extrapolated melting offset temperature was lower than the CFT outflow onset temperature, and that the polymer did not flow out unless in a completely melted state. That is, the polymer did not flow out at a temperature not higher than the DSC extrapolated melting offset temperature, and partial melt extrusion was not possible. FIG. 1 shows measurement results of CFT and DSC.

Example 1

Sample S2

P(3HB-co-11.8 mol % 4HB) having a Mw of 1.16 million (Sample S2) was analyzed by CFT and DSC. The CFT occurred. Thus, the procedure could be proceeded to winding and stretching without taking a crystallization time of about 30 minutes to 1 hour at room temperature. That is, it was demonstrated that partial melt extrusion spinning could shorten the crystallization time, improve the melt processability of the polymer, and enhance productivity.

TABLE 2

Melted states before and after melt extrusion and change in molecular weight Mw after melt extrusion at each temperature of Sample S2 (P(3HB-co-1 1.8 mol % 4HB))

| Sample No. | Example Comparative Example | Partially-melt extrudable temperature [° C.] | Melt extrusion temperature [° C.] | Melted state | Mw before and after melt extrusion | Mw residual ratio*3 [%] |
|---|---|---|---|---|---|---|
| S2 | | 131.3 to 158.7 | Unmelted | Unmelted | 1.16 million*1 | 100 |
| S2 | Example 11 | 131.3 to 158.7 | 135.0 | Partially melted | 1.10 million*2 | 95 |
| S2 | Example 12 | 131.3 to 158.7 | 150.0 | Partially melted | 1.08 million*2 | 93 |
| S2 | Comparative Example 3 | 131.3 to 158.7 | 170.0 | Melted | 720000*2 | 62 |
| S2 | Comparative Example 4 | 131.3 to 158.7 | 180.0 | Melted | 460000*2 | 39 |

*1Mw before melt extrusion
*2Mw after melt extrusion
*3Mw residual ratio: [weight average molecular weight (Mw) after melt extrusion ÷ weight average molecular weight (Mw) before melt extrusion] × 100 outflow onset temperature was 131.3° C., and the width of the crystal melting peak by DSC was approximately from 80 to 167° C. The crystal melting peak apexes were 95.2° C. and 141.8° C., the DSC extrapolated melting offset temperature was 158.7° C., and the temperature at which the melting point peak reached the baseline was 167.0° C. It has been found that the DSC extrapolated melting offset temperature was higher than the CFT outflow onset temperature, and that the polymer could be partially melt extruded in a range of 131.3° C. or higher and lower than 158.7° C. FIG. 2 shows measurement results of CFT and DSC.

Melt spinning was performed at 135° C. (Example 11) or 150° C. (Example 12) as a temperature allowing partial melting, or at 170° C. (Comparative Example 3) or 180° C. (Example 4) as a temperature at which the polymer was almost melted.

The Mw before melt spinning was 1.16 million, whereas the Mw after partial melt spinning at 135° C. was 1.10 million, the Mw after partial melt spinning at 150° C. was 1.08 million, the Mw after partial melt spinning at 170° C. was 720000, and the Mw after melt spinning at 180° C. was 460000. When the molecular weight Mw of 1.16 million before melt spinning was defined as 100%, the residual ratio of the molecular weight Mw after melt spinning at each temperature was 95% at 135° C. and 93% at 150° C. On the other hand, the residual ratio was 62% at 170° C. and 39% at 180° C. These results revealed that ability to spin at a lower temperature was effective in suppressing the reduction in molecular weight. Especially, in the partial melt spinning at 135° C. or 150° C. where the polymer was not in a completely melted state, the reduction in molecular weight was prominently suppressed. The results are shown in Table 2.

In addition, in partial melt extrusion spinning at 135° C. or 150° C., the tackiness of the polymer immediately after spinning, which manifested in melt extrusion spinning at 170° C. and 180° C., was suppressed, and no agglutination Example 2

Sample S3

P(3HB-co-13.1 mol % 4HB) having a Mw of 1.00 million (Sample S3) was analyzed by CFT and DSC. The CFT outflow onset temperature was 125.1° C., and the width of the crystal melting peak by DSC was approximately from 49 to 144° C. The crystal melting peak apexes were 63.7° C. and 114.8° C., the DSC extrapolated melting offset temperature was 135.1° C., and the temperature at which the melting point peak reached the baseline was 155.0° C. It has been found that the DSC extrapolated melting offset temperature was higher than the CFT outflow onset temperature, and that the polymer could be partially melt extruded in a range of 125.1° C. or higher and lower than 135.1° C. FIG. 3 shows measurement results of CFT and DSC.

Melt spinning was performed at 126° C. (Example 13), 130° C. (Example 14), or 135° C. (Example 15) as a temperature allowing partial melting, or at 150° C. (Comparative Example 5), 160° C. (Comparative Example 6), or 170° C. (Comparative Example 7) as a temperature at which the polymer was almost melted.

The Mw before melt spinning was 1 million, whereas the Mw after partial melt spinning at 126° C. was 950000, the Mw after partial melt spinning at 130° C. was 970000, the Mw after partial melt spinning at 135° C. was 970000, the Mw after partial melt spinning at 140° C. was 920000, the Mw after melt spinning at 150° C. was 820000, the Mw after melt spinning at 160° C. was 650000, and the Mw after melt spinning at 170° C. was 540000. When the molecular weight Mw of 1 million before melt spinning was defined as 100%, the residual ratio of the molecular weight Mw after melt spinning at each temperature was 95%, at 126° C., 97% at 130° C., 97% at 135° C., 82% at 150° C., and 65% at 160° C. On the other hand, the residual ratio was 53% at 170° C. These results revealed that spinning could be performed at a lower temperature and that ability to spin, especially, at a low temperature at which the polymer could be in a partially melted state was effective in suppressing the reduction in molecular weight. Especially, in the partial melt spinning at 135° C. or lower where the polymer was not in a completely melted state, the reduction in molecular weight was prominently suppressed.

The results are shown in Table 3.

In the melt spinning at 170° C., the tackiness of the extruded polymer was strong, and agglutination was observed. The polymer which had solidified after winding could not be unraveled. On the other hand, almost no tackiness was observed in yarns obtained by partial melt extrusion spinning at 135° C. or lower, and the yarns could be wound and stretched without agglutination immediately after spinning. That is, it was demonstrated that partial melt extrusion spinning could shorten the crystallization time, improve the melt processability of the polymer, and enhance productivity.

Melt spinning was performed at 115° C. (Example 16), 130° C. (Example 17), or 140° C. (Example 18) as a temperature allowing partial melting, or at 170° C. (Comparative Example 8) as a temperature at which the polymer was almost melted.

The Mw before melt spinning was 900000, whereas the Mw after partial melt spinning at 115° C. was 890000, the Mw after partial melt spinning at 130° C. was 840000, the Mw after partial melt spinning at 140° C. was 870000, the Mw after melt spinning at 150° C. was 870000, and the Mw after partial melt spinning at 170° C. was 550000. When the molecular weight Mw of 900000 before melt spinning was defined as 100%, the residual ratio of the molecular weight Mw after melt spinning at each temperature was 99% at 115° C., 94% at 130° C., and 97% at 140° C. On the other hand, was 61% at 170° C. These results revealed that ability to spin at a lower temperature was effective in suppressing the

TABLE 3

Melted states before and after melt extrusion and change in molecular weight Mw after melt extrusion at each temperature of Sample S3 (P(3HB-co-13.1 mol % 4HB))

| Sample No. | Example Comparative Example | Partially-melt extrudable temperature [° C.] | Melt extrusion temperature [° C.] | Melted state | Mw before and after melt extrusion | Mw residual ratio*3 [%] |
|---|---|---|---|---|---|---|
| S3 | | 125.1 to 135.1 | Unmelted | Unmelted | 1.00 million*1 | 100 |
| S3 | Example 13 | 125.1 to 135.1 | 126.0 | Partially melted | 950000*2 | 95 |
| S3 | Example 14 | 125.1 to 135.1 | 130.0 | Partially melted | 970000*2 | 97 |
| S3 | Example 15 | 125.1 to 135.1 | 135.0 | Partially melted | 970000*2 | 97 |
| S3 | Comparative Example 5 | 125.1 to 135.1 | 150.0 | Melted | 820000*2 | 82 |
| S3 | Comparative Example 6 | 125.1 to 135.1 | 160.0 | Melted | 650000*2 | 65 |
| S3 | Comparative Example 7 | 125.1 to 135.1 | 170.0 | Melted | 540000*2 | 53 |

*1 Mw before melt extrusion

*2 Mw after melt extrusion

*3 Mw residual ratio: [weight average molecular weight (Mw) after melt extrusion ÷ weight average molecular weight (Mw) before melt extrusion] × 100

Example 3

Sample S4

P(3HB-co-14.7 mol % 4HB) having a Mw of 900000 (Sample S4) was analyzed by CFT and DSC. The CFT outflow onset temperature was 113.9° C., and the width of the crystal melting peak by DSC was approximately from 88 to 145° C. The crystal melting peak apex was 93.6° C., the DSC extrapolated melting offset temperature was 140.9° C., and the temperature at which the melting point peak reached the baseline was 144.7° C. It has been found that the DSC extrapolated melting offset temperature was higher than the CFT outflow onset temperature, and that the polymer could be partially melt extruded in a range of 113.9° C. or higher and lower than 140.9° C. FIG. 4 shows measurement results of CFT and DSC.

reduction in molecular weight. Especially, in the low-temperature partial melt spinning at 140° C. or lower where the polymer was in a partially melted state, the reduction in molecular weight was prominently suppressed. The results are shown in Table 4.

In the melt spinning at 170° C., the tackiness of the extruded polymer was strong, and agglutination was observed. The polymer which had solidified after winding could not be unraveled. On the other hand, almost no tackiness was observed in yarns obtained by partial melt extrusion spinning at 140° C. or lower, and the yarns could be wound and stretched without agglutination immediately after spinning. That is, it was demonstrated that partial melt extrusion spinning could shorten the crystallization time, improve the melt processability of the polymer, and enhance productivity.

TABLE 4

Melted states before and after melt extrusion and change
in molecular weight Mw after melt extrusion at each
temperature of Sample S4 (P(3HB-co-14.7 mol % 4HB))

| Sample No. | Example Comparative Example | Partially-melt extrudable temperature [° C.] | Melt extrusion temperature [° C.] | Melted state | Mw before and after melt extrusion | Mw residual ratio*3 [%] |
|---|---|---|---|---|---|---|
| S4 | | 113.9 to 140.9 | Unmelted | Unmelted | 900000*1 | 100 |
| S4 | Example 16 | 113.9 to 140.9 | 115.0 | Partially melted | 890000*2 | 99 |
| S4 | Example 17 | 113.9 to 140.9 | 130.0 | Partially melted | 840000*2 | 94 |
| S4 | Example 18 | 113.9 to 140.9 | 140.0 | Partially melted | 870000*2 | 97 |
| S4 | Comparative Example 8 | 113.9 to 140.9 | 170.0 | Melted | 550000*2 | 61 |

*1Mw before melt extrusion
*2Mw after melt extrusion
*3Mw residual ratio: [weight average molecular weight (Mw) after melt extrusion ÷ weight average molecular weight (Mw) before melt extrusion] × 100

Example 4

Sample S5

P(3HB-co-15.3 mol % 4HB) having a Mw of 750000 (Sample S5) was analyzed by CFT and DSC. The CFT outflow onset temperature was 109.4° C., and the width of the crystal melting peak by DSC was approximately from 58 to 170° C. The crystal melting peak apexes were 65.5, 92.7, 110.0, and 164.3° C., the DSC extrapolated melting offset temperatures were 80.0, 109.0, 130.2, and 168.9° C., and the temperature at which the melting point peak reached the baseline was 172.6° C. It has been found that the DSC extrapolated melting offset temperature was higher than the CFT outflow onset temperature, and that the polymer could be partially melt extruded in a range of 109.4° C. or higher and lower than 168.9° C. FIG. 5 shows measurement results of CFT and DSC.

Melt spinning was performed at 115° C. (Example 19), 120° C. (Example 20), or 125° C. (Example 21) as a temperature allowing partial melting.

The Mw before melt spinning was 750000, whereas the Mw after partial melt spinning at 115° C., 120° C., and 125° C. was all 750000. It has been revealed that ability to spin at a temperature much lower than 150° C. was effective in suppressing the reduction in molecular weight. The results are shown in Table 5.

Almost no tackiness was observed in yarns obtained by partial melt extrusion spinning at 125° C. or lower, and the yarns could be wound and stretched without agglutination immediately after spinning. That is, it was demonstrated that partial melt extrusion spinning could shorten the crystallization time, improve the melt processability of the polymer, and enhance productivity.

TABLE 5

Melted states before and after melt extrusion and change
in molecular weight Mw after melt extrusion at each
temperature of Sample S5 (P(3HB-co-15.3 mol % 4HB))

| Sample No. | Example Comparative Example | Partially-melt extrudable temperature [° C.] | Melt extrusion temperature [° C.] | Melted state | Mw before and after melt extrusion | Mw residual ratio*3 [%] |
|---|---|---|---|---|---|---|
| S5 | | 109.4 to 168.9 | Unmelted | Unmelted | 750000*1 | 100 |
| S5 | Example 19 | 109.4 to 168.9 | 115.0 | Partially melted | 750000*2 | 99 |
| S5 | Example 20 | 109.4 to 168.9 | 120.0 | Partially melted | 750000*2 | 100 |
| S5 | Example 21 | 109.4 to 168.9 | 125.0 | Partially melted | 750000*2 | 100 |

*1Mw before melt extrusion
*2Mw after melt extrusion
*3Mw residual ratio: [weight average molecular weight (Mw) after melt extrusion ÷ weight average molecular weight (Mw) before melt extrusion] × 100

Example 5

Sample S6

P(3HB-co-15.3 mol % 4HB) having a Mw of 710000 (Sample S6) was analyzed by CFT and DSC. The CFT outflow onset temperature was 113.8° C., and the width of the crystal melting peak by DSC was approximately from 81 to 155° C. The crystal melting peak apex was 91.2° C., the DSC extrapolated melting offset temperature was 145.6° C., and the temperature at which the melting point peak reached the baseline was 161.1° C. It has been found that the DSC extrapolated melting offset temperature was higher than the CFT outflow onset temperature, and that the polymer could be partially melt extruded in a range of 113.8° C. or higher and lower than 145.6° C. FIG. 6 shows measurement results of CFT and DSC.

Melt spinning was performed at 160° C. (Comparative Example 9) or 170° C. (Comparative Example 10) as a temperature at which the polymer was almost melted.

The Mw before melt spinning was 710000, while the Mw after melt spinning at 160° C. was 480000 and the Mw after melting spinning at 170° C. was 310000, revealing that the reduction in molecular weight is unavoidable in melt spinning at high temperatures, 160° C. and 170° C., at which the polymer is not in a partially melted state. The results are shown in Table 6.

A strong tackiness was observed in the polymers extruded by melt spinning at 160° C. and 170° C., and the crystal solidification time of approximately 30 minutes to 1 hour at room temperature was required in order to stretch the polymer.

temperature side was 175.9° C.; and the temperature at which the melting point peak reached the baseline was 178.2° C. It has been found that the DSC extrapolated melting offset temperature was higher than the CFT outflow onset temperature, and that the polymer could be partially melt extruded in a range of 94.0° C. or higher and lower than 175.9° C. FIG. 7 shows measurement results of CFT and DSC.

Melt spinning was performed at 130° C. (Example 22) or 160° C. (Example 23) as a temperature allowing partial melting.

The Mw before melt spinning was 620000, whereas the Mw after partial melt spinning at 130° C. was 610000, the Mw after partial melt spinning at 160° C. was 500000, and the Mw after partial melt spinning at 170° C. was 440000. When the molecular weight Mw of 620000 before melt spinning was defined as 100%, the residual ratio of the molecular weight Mw after melt spinning at each tempera-

TABLE 6

Melted states before and after melt extrusion and change
in molecular weight Mw after melt extrusion at each
temperature of Sample S6 (P(3HB-co-15.3 mol % 4HB))

| Sample No. | Example Comparative Example | Partially-melt extrudable temperature [° C.] | Melt extrusion temperature [° C.] | Melted state | Mw before and after melt extrusion | Mw residual ratio[*3] [%] |
|---|---|---|---|---|---|---|
| S6 | | 113.8 to 145.6 | Unmelted | Unmelted | 710000[*1] | 100 |
| S6 | Comparative Example 9 | 113.8 to 145.6 | 160.0 | Melted | 480000[*2] | 68 |
| S6 | Comparative Example 10 | 113.8 to 145.6 | 170.0 | Melted | 310000[*2] | 43 |

[*1]Mw before melt extrusion
[*2]Mw after melt extrusion
[*3]Mw residual ratio: [weight average molecular weight (Mw) after melt extrusion ÷ weight average molecular weight (Mw) before melt extrusion] × 100

Example 6

Sample S7

P(3HB-co-16.0 mol % 4HB) having a Mw of 620000 (Sample S7) was analyzed by CFT and DSC. The CFT outflow onset temperature was 94.0° C., and the width of the crystal melting peak by DSC was approximately from 57 to 178° C. The crystal melting peak apex was 99.4° C.; the DSC extrapolated melting offset temperature of the main melting peak was 105.8° C.; the DSC extrapolated melting offset temperature of a broad melting peak following the main melting peak was 139.7° C.; the DSC extrapolated melting offset temperature of the melting peak on a high ture was 98% at 130° C. and 81% at 160° C., but, on the other hand, was 71% at 170° C. In a case of Sample S7 in which some of the crystals that melt at a high temperature region (around 172° C.) were present in DSC, the polymer was considered to be in a partial melting state in which some of the crystals remained unmelted even at 160 and 170° C. However, the temperature was relatively high for the melting temperature for PHA, and thus a decrease in molecular weight was observed. When melt spinning was performed at a low temperature, 130° C., the reduction in molecular weight was clearly suppressed, and the results confirmed that ability to spin at a lower temperature was effective in suppressing the reduction in molecular weight.

TABLE 7

Melted states before and after melt extrusion and change
in molecular weight Mw after melt extrusion at each
temperature of Sample S7 (P(3HB-co-16.0 mol % 4HB))

| Sample No. | Example Comparative Example | Partially-melt extrudable temperature [° C.] | Melt extrusion temperature [° C.] | Melted state | Mw before and after melt extrusion | Mw residual ratio[*3] [%] |
|---|---|---|---|---|---|---|
| S7 | | 94.0 to 175.9 | Unmelted | Unmelted | 620000[*1] | 100 |
| S7 | Example 22 | 94.0 to 175.9 | 130.0 | Partially melted | 610000[*2] | 98 |

TABLE 7-continued

Melted states before and after melt extrusion and change
in molecular weight Mw after melt extrusion at each
temperature of Sample S7 (P(3HB-co-16.0 mol % 4HB))

| Sample No. | Example Comparative Example | Partially-melt extrudable temperature [° C.] | Melt extrusion temperature [° C.] | Melted state | Mw before and after melt extrusion | Mw residual ratio*³ [%] |
|---|---|---|---|---|---|---|
| S7 | Example 23 | 94.0 to 175.9 | 160.0 | Partially melted | 500000*² | 81 |

*¹Mw before melt extrusion
*²Mw after melt extrusion
*³Mw residual ratio: [weight average molecular weight (Mw) after melt extrusion ÷ weight average molecular weight (Mw) before melt extrusion] × 100

Example 7

Sample S8

P(3HB-co-17.8 mol % 4HB) having a Mw of 580000 (Sample S8) was analyzed by CFT and DSC. The CFT outflow onset temperature was 96.2° C., and the width of the crystal melting peak by DSC was approximately from 43 to 177° C. The crystal melting peak apexes were 47.5° C. and 100.6° C., and there was an apex of a small melting peak that would be derived from the 3HB-rich crystals also at 166.6° C. The DSC extrapolated melting offset temperature of the main melting peak was 107.3° C.; the DSC extrapolated melting offset temperature of a broad melting peak following the main melting peak was 142.1° C.; the DSC extrapolated melting offset temperature of the melting peak on a high temperature side was 175.6° C.; and the temperature at which the melting point peak reached the baseline was 177.6° C. It has been found that the DSC extrapolated melting offset temperature was higher than the CFT outflow onset temperature, and that the polymer could be partially melt extruded in a range of 96.2° C. or higher and lower than 175.6° C. FIG. 8 shows measurement results of CFT and DSC.

Example 8

Sample S9

P(3HB-co-17.9 mol % 4HB) having a Mw of 630000 (Sample S9) was analyzed by CFT and DSC. The CFT outflow onset temperature was 131.3° C., and the width of the crystal melting peak by DSC was approximately from 90 to 149° C. The crystal melting peak apexes were 116.9° C. and 131.7° C., the DSC extrapolated melting offset temperature was 146.0° C., and the temperature at which the melting point peak reached the baseline was 151.7° C. It has been found that the DSC extrapolated melting offset temperature was higher than the CFT outflow onset temperature, and that the polymer could be partially melt extruded in a range of 131.3° C. or higher and lower than 146.0° C. FIG. 9 shows measurement results of CFT and DSC.

Example 9

Sample S10

P(3HB-co-28.7 mol % 4HB) having a Mw of 1.05 million (Sample S10) was analyzed by CFT and DSC. The CFT outflow onset temperature was 109.5° C., and the width of the crystal melting peak by DSC was approximately from 39 to 167° C. The crystal melting peak apexes were 47.0° C. and 164.0° C., the DSC extrapolated melting offset temperatures were 55.9° C. and 166.7° C., and the temperature at which the melting point peak reached the baseline was 170.3° C. There was a possibility that the melting peak on a high temperature side might be a peak resulting from biosynthesis while a slight amount of 3HB-rich PHA was slightly blended. However, the DSC extrapolated melting offset temperature was higher than the CFT outflow onset temperature, and the crystal component was considered to remain in a range of 109.5 or higher and lower than 166.7° C. It was found that the polymer could be partially melt extruded in this range. FIG. 10 shows measurement results of CFT and DSC.

Example 10

Sample S11

P(3HB-co-32.9 mol % 4HB) having a Mw of 1.04 million (Sample S11) was analyzed by CFT and DSC. The CFT outflow onset temperature was 123.1° C., and the width of the crystal melting peak by DSC was approximately from 40 to 148° C. The crystal melting peak apexes were 44.8° C., 79.1° C. and 123.8° C., the DSC extrapolated melting offset temperatures were 55.9° C., 88.1° C. and 144.7° C., and the temperature at which the melting point peak reached the baseline was 151.4° C. It has been found that the DSC extrapolated melting offset temperature was higher than the CFT outflow onset temperature, and that the polymer could be partially melt extruded in a range of 123.1° C. or higher and lower than 144.7° C. FIG. 11 shows measurement results of CFT and DSC.

Comparative Example 2

Sample S12

P(3HB-co-74.6 mol % 4HB) having a Mw of 1.11 million (Sample S12) was analyzed by CFT and DSC. The CFT outflow onset temperature was 94.6° C., and the width of the crystal melting peak by DSC was approximately from 39 to 72° C. The crystal melting peak apex was 58.7° C., the DSC extrapolated melting offset temperature was 64.1° C., and the temperature at which the melting point peak reached the baseline was 72.1° C. It was found that the DSC extrapolated melting offset temperature was lower than the CFT outflow onset temperature, and that the polymer did not flow out unless in a completely melted state at 94.6° C. or higher. FIG. 12 shows measurement results of CFT and DSC.

The measurement results of DSC and CFT of the 3HV-containing PHA copolymers are shown in Table 8 below.

TABLE 8

Partial melt spinning situation and heating state change behavior of 3HV-containing PHA copolymer

| | Sample No. | Example Comparative Example | Composition | CFT outflow onset temperature [° C.] | Extrapolated melting offset temperature of DSC 1st heating peaks [° C.] | Baseline arrival temperature at DSC 1st heating peaks [° C.] | Whether partial melt extrusion is possible or not | Partially-melt extrudable temperature [° C.] |
|---|---|---|---|---|---|---|---|---|
| FIG. 1 | S1 | Comparative Example 1 | 3HB 100 mol % | 181.0 | 179.7 | 188.7 | Not possible | — |
| FIG. 13 | S13 | Example 24 | 3HV 8.0 mol % | 151.6 | 164.9 | 173.9 | Possible | 151.6 to 164.9 |
| FIG. 14 | S14 | Example 25 | 3HV 12.0 mol % | 140.4 | 156.7 | 165.7 | Possible | 140.4 to 156.7 |
| FIG. 15 | S15 | Example 26 | 3HV 35.5 mol % | 85.1 | 106.0, 173.0 | 174.6 | Possible | 85.1 to 173.0 |
| FIG. 16 | S16 | Example 27 | 3HV 48.2 mol % | 83.8 | 94.8, 173.7 | 177.7 | Possible | 83.8 to 173.7 |
| FIG. 17 | S17 | Example 28 | 3HV 61.5 mol % | 84.5 | 97.5, 173.2 | 178.5 | Possible | 84.5 to 173.2 |
| FIG. 18 | S18 | Example 29 | 3HV 73.2 mol % | 91.1 | 101.3, 174.3 | 178.2 | Possible | 91.1 to 174.3 |

Example 24

Sample S13

P(3HB-co-8.0 mol % 3HV) having a Mw of 460000 (Sample S13) was analyzed by CFT and DSC. The CFT outflow onset temperature was 151.6° C., and the width of the crystal melting peak by DSC was approximately from 125 to 174° C. The crystal melting peak apex was 152.1° C., the DSC extrapolated melting offset temperature was 164.9° C., and the temperature at which the melting point peak reached the baseline was 173.9° C. It has been found that the DSC extrapolated melting offset temperature was higher than the CFT outflow onset temperature, and that the polymer could be partially melt extruded in a range of 151.6° C. or higher and lower than 164.9° C. FIG. 13 shows measurement results of CFT and DSC.

Melt spinning was performed at 160° C. (Example 30) as a temperature allowing partial melting, or at 175° C. (Comparative Example 11) or 185° C. (Comparative Example 12) as a temperature at which the polymer was almost melted.

The Mw before melt spinning was 460000, whereas the Mw after melt spinning at 160° C. was 450000, the Mw after melt spinning at 175° C. was 390000, and the Mw after melt spinning at 185° C. was 360000. When the molecular weight Mw of 460000 before melt spinning was defined as 100%, the residual ratio of the molecular weight Mw after melt spinning at each temperature was 97% at 160° C., but, on the other hand, was 86% at 175° C. and 79% at 185° C.

Not only the P(3HB-co-4HB) copolymer, but also P(3HB-co-3HV) copolymers comprising other monomer units exhibited a prominent effect of suppressing the reduction in molecular weight in melt spinning at a lower temperature. The results are shown in Table 9.

In the melt spinning at 185° C., the tackiness of the extruded polymer was strong, agglutination was observed, and the polymer solidified after winding could not be unraveled. On the other hand, almost no tackiness was observed in yarns obtained by partial melt extrusion spinning at 160° C., and the yarns could be wound and stretched without agglutination immediately after spinning. That is, it was demonstrated that, by partial melt extrusion spinning, the crystallization time can be shortened, the melt processability of the polymer can be improved, and productivity can be enhanced.

TABLE 9

Melted states before and after melt extrusion and change in molecular weight Mw after melt extrusion at each temperature of Sample S13 (P(3HB-co-8.0 mol % 3HV))

| Sample No. | Example Comparative Example | Partially-melt extrudable temperature [° C.] | Melt extrusion temperature [° C.] | Melted state | Mw before and after melt extrusion | Mw residual ratio[3] [%] |
|---|---|---|---|---|---|---|
| S13 | | 151.6 to 164.9 | Unmelted | Unmelted | 460000[1] | 100 |
| S13 | Example 30 | 151.6 to 164.9 | 160.0 | Partially melted | 450000[2] | 97 |
| S13 | Comparative Example 11 | 151.6 to 164.9 | 175.0 | Melted | 400000[2] | 86 |
| S13 | Comparative Example 12 | 151.6 to 164.9 | 185.0 | Melted | 360000[2] | 79 |

[1]Mw before melt extrusion

[2]Mw after melt extrusion

[3]Mw residual ratio: [weight average molecular weight (Mw) after melt extrusion ÷ weight average molecular weight (Mw) before melt extrusion] × 100

Example 25

Sample S14

P(3HB-co-12.0 mol % 3HV) having a Mw of 190000 (Sample S14) was analyzed by CFT and DSC. The CFT outflow onset temperature was 140.4° C., and the width of the crystal melting peak by DSC was approximately from 124 to 166° C. The crystal melting peak apex was 144.9° C., the DSC extrapolated melting offset temperature was 156.7° C., and the temperature at which the melting point peak reached the baseline was 165.7° C. It has been found that the DSC extrapolated melting offset temperature was higher than the CFT outflow onset temperature, and that the polymer could be partially melt extruded in a range of 140.4° C. or higher and lower than 156.7° C. FIG. 14 shows measurement results of CFT and DSC.

Melt spinning was performed at 145° C. (Example 31), 150° C. (Example 32), or 155° C. (Example 33) as a temperature allowing partial melting, or at 170° C. (Comparative Example 13) as a temperature at which the polymer was almost melted.

The Mw before melt spinning was 190000, whereas the Mws after melt spinning at 145° C., 150° C., and 155° C. were all 160000 and the Mw after melt spinning at 170° C. was 190000. When the molecular weight Mw of 190000 before melt spinning was defined as 100%, the residual ratio of the molecular weight Mw after melt spinning at each temperature was 98% at 145° C., 98% at 150° C., and 98% at 155° C., but, on the other hand, was 83% at 170° C.

Not only the P(3HB-co-4HB) copolymer, but also P(3HB-co-3HV) copolymers had a prominent effect of suppressing the reduction in molecular weight in melt spinning at a lower temperature. The results are shown in Table 10.

In the melt spinning at 170° C., the tackiness of the extruded polymer was strong, agglutination was observed, and the polymer solidified after winding could not be unraveled. On the other hand, almost no tackiness was observed in yarns obtained by partial melt extrusion spinning at 150° C. or lower, and the yarns could be wound and stretched without agglutination immediately after spinning. That is, it was demonstrated that, by partial melt extrusion spinning, the crystallization time can be shortened, the melt processability of the polymer can be improved, and productivity can be enhanced.

Example 26

Sample S15

P(3HB-co-35.5 mol % 3HV) having a Mw of 330000 (Sample S15) was analyzed by CFT and DSC. The CFT outflow onset temperature was 85.1° C., and the width of the crystal melting peak by DSC was approximately from 45 to 173° C. The crystal melting peak apex was 89.0° C., and there was an apex of a small melting peak that would be derived from the 3HB-rich crystals also at 165.4° C. The DSC extrapolated melting offset temperature of the main melting peak was 106.0° C.; the DSC extrapolated melting offset temperature of the melting peak on a high temperature side was 173.0° C.; and the temperature at which the melting point peak reached the baseline was 174.6° C. It has been found that the DSC extrapolated melting offset temperature was higher than the CFT outflow onset temperature, and that the polymer could be partially melt extruded in a range of 85.1° C. or higher and lower than 173.0° C. It can be seen that, even assuming that the component indicated by the small melting peak on the high temperature side, which would had been derived from 3HB-rich crystals was absent, the extrapolated melting offset temperature of the melting peak on a low temperature side was 106.0° C., and, in this case, partial melt extrusion could be performed in a range of 85.1° C. or higher and lower than 106.0° C. FIG. 15 shows the measurement results of CFT and DSC.

Example 27

Sample S16

P(3HB-co-48.2 mol % 3HV) having a Mw of 830000 (Sample S16) was analyzed by CFT and DSC. The CFT outflow onset temperature was 83.8° C., and the width of the crystal melting peak by DSC was approximately from 50 to 178° C. The crystal melting peak apexes were 75.0° C. and 88.7° C., and there was an apex of a small melting peak that would be derived from the 3HB-rich crystals also at 165.7° C. The DSC extrapolated melting offset temperature of the main melting peak was 94.8° C.; the DSC extrapolated melting offset temperature of the melting peak on a high temperature side was 173.7° C.; and the temperature at which the melting point peak reached the baseline was

TABLE 10

Melted states before and after melt extrusion and change in molecular weight Mw after melt extrusion at each temperature of Sample S14 (P(3HB-co-12.0 mol % 3HV))

| Sample No. | Example Comparative Example | Partially-melt extrudable temperature [° C.] | Melt extrusion temperature [° C.] | Melted state | Mw before and after melt extrusion | Mw residual ratio[*3] [%] |
|---|---|---|---|---|---|---|
| S14 | | 140.4 to 156.7 | Unmelted | Unmelted | 190000[*1] | 100 |
| S14 | Example 31 | 140.4 to 156.7 | 145.0 | Partially melted | 190000[*2] | 98 |
| S14 | Example 32 | 140.4 to 156.7 | 150.0 | Partially melted | 190000[*2] | 98 |
| S14 | Example 33 | 140.4 to 156.7 | 155.0 | Partially melted | 190000[*2] | 98 |
| S14 | Comparative Example 13 | 140.4 to 156.7 | 170.0 | Melted | 160000[*2] | 83 |

[*1]Mw before melt extrusion
[*2]Mw after melt extrusion
[*3]Mw residual ratio: [weight average molecular weight (Mw) after melt extrusion ÷ weight average molecular weight (Mw) before melt extrusion] × 100

177.7° C. It has been found that the DSC extrapolated melting offset temperature was higher than the CFT outflow onset temperature, and that the polymer could be partially melt extruded in a range of 83.8° C. or higher and lower than 173.7° C. It can be seen that, even assuming that the component indicated by the small melting peak on the high temperature side, which would had been derived from 3HB-rich crystals was absent, the extrapolated melting offset temperature of the melting peak on a low temperature side was 94.8° C., and, in this case, partial melt extrusion could be performed in a range of 83.8° C. or higher and lower than 94.8° C. FIG. 16 shows the measurement results of CFT and DSC.

Example 28

Sample S17

P(3HB-co-61.5 mol % 3HV) having a Mw of 730000 (Sample S17) was analyzed by CFT and DSC. The CFT outflow onset temperature was 84.5° C., and the width of the crystal melting peak by DSC was approximately from 56 to 178° C. The crystal melting peak apex was 90.5° C., and there was an apex of a small melting peak that would be derived from the 3HB-rich crystals also at 166.3° C. The DSC extrapolated melting offset temperature of the main melting peak was 97.5° C.; the DSC extrapolated melting offset temperature of the melting peak on a high temperature side was 173.2° C.; and the temperature at which the melting point peak reached the baseline was 178.5° C. It has been found that the DSC extrapolated melting offset temperature was higher than the CFT outflow onset temperature, and that the polymer could be partially melt extruded in a range of 84.5° C. or higher and lower than 173.2° C. It can be seen that, even assuming that the component indicated by the small melting peak on the high temperature side, which would had been derived from 3HB-rich crystals was absent, the extrapolated melting offset temperature of the melting peak on a low temperature side was 97.5° C., and, in this case, partial melt extrusion could be performed in a range of 84.5° C. or higher and lower than 97.5° C. FIG. 17 shows the measurement results of CFT and DSC.

Example 29

Sample S18

P(3HB-co-73.2 mol % 3HV) having a Mw of 730000 (Sample S18) was analyzed by CFT and DSC. The CFT outflow onset temperature was 91.1° C., and the width of the crystal melting peak by DSC was approximately from 64 to 179° C. The crystal melting peak apex was 95.0° C., and there was an apex of a small melting peak that would be derived from the 3HB-rich crystals also at 166.9° C. The DSC extrapolated melting offset temperature of the main melting peak was 101.3° C.; the DSC extrapolated melting offset temperature of the melting peak on a high temperature side was 174.3° C.; and the temperature at which the melting point peak reached the baseline was 178.2° C. It has been found that the DSC extrapolated melting offset temperature was higher than the CFT outflow onset temperature, and that the polymer could be partially melt extruded in a range of 91.1° C. or higher and lower than 174.3° C. It can be seen that, even assuming that the component indicated by the small melting peak on the high temperature side, which would had been derived from 3HB-rich crystals was absent, the extrapolated melting offset temperature of the melting peak on a low temperature side was 101.3° C., and, in this case, partial melt extrusion could be performed in a range of 91.1° C. or higher and lower than 101.3° C. FIG. 18 shows measurement results of CFT and DSC.

<Analysis of Partial Melting State>

From the shape of the melting peak of the thermoplastic polymer observed in the temperature raising process of DSC, it is considered that the crystal structure was retained in melt-molding in a temperature region lower than the extrapolated melting offset temperature. When the outflow onset temperature in the flow tester temperature raising method was lower than the DSC extrapolated melting offset temperature, it is considered that the polymer was molded in a partially melted state at a temperature between the CFT outflow onset temperature and the DSC extrapolated melting offset temperature. The changes in crystal structure of the polymer in the temperature raising process of DSC were analyzed using wide angle X-ray diffraction (WAXD).

Reference Example 1

Two (2) mg of Sample S7, P(3HB-co-16.0 mol % 4HB) used in Examples 6, 22, and 23 was placed in a capillary for X-ray and placed in a temperature raising device capable of measuring DSC. Wide angle X-rays were taken while heating at a temperature raising rate of 10° C./min. The wide angle X-ray was measured in 2° C. increments with an imaging time of 1 second. DSC measurements were performed at a temperature of from about 50° C. to 200° C. The DSC curve and wide angle X-ray measurement diffraction diagram at that time are shown in FIG. 19.

Two endothermic (melting) peaks were observed in the DSC curve. It is believed that the endothermic peak on the low temperature side was the melting peak of thin lamellar crystals. It is believed that the endothermic peak on the high temperature was the melting peak of thick lamellar crystals. In the wide angle X-ray diagram, two ring patterns indicating the presence of distinct crystals could be confirmed. It is seen that, since the two peaks from the crystals did not disappear even beyond the endothermic peak on the low temperature side, the thick crystals were retained.

As shown in Example 6, this sample could be partially melt extruded in the range of 94.0° C. or higher and lower than 175.9° C., and, in fact, could be melt extruded and spun also at 130° C., which was within that range (Example 22). The crystal-derived peak (ring pattern) could also be confirmed also at 130° C. from the wide angle X-ray diagram. Therefore, it was proved that, in the melt spinning at 130° C. using this sample, spinning could be performed in a state where not all the crystals were melted, that is, in a partially melted state.

Reference Example 2

Two (2) mg of Sample S14, P(3HB-co-12.0 mol % 3HV) used in Examples 25, 31, 32, and 33 and Comparative Example 13 was placed in a capillary for X-ray and placed in a temperature raising device capable of measuring DSC. Wide angle X-rays were taken while heating at a temperature raising rate of 10° C./min. The wide angle X-ray was measured in 2° C. increments with an imaging time of 1 second. DSC measurements were performed at a temperature of from about 50° C. to 200° C. The DSC curve and wide angle X-ray measurement diffraction diagram at that time are shown in FIG. 20.

Only one endothermic peak was present in this DSC curve. In the wide angle X-ray diagram, two distinct crystal-derived diffraction patterns could be observed. As shown in Example 25, this sample could be partially melt extruded in the range of 140.4° C. or higher and lower than 156.7° C., and could be partially melt extruded and spun also at 145° C., 150° C., and 155° C., which were actually within that range (Examples 31, 32, and 33). In the diffraction pattern at 150° C. indicated by 4 in the wide angle X-ray diagram in FIG. 21, there was a crystal-derived pattern at a melt spinning temperature of 150° C. as well. Thus, it was proved that spinning was possible in a state where not all the crystals were melted, that is, in a partially melted state. Also in the wide-angle X-ray diffraction diagram (5 in FIG. 20) at 160° C. between the extrapolated melting offset temperature (156.7° C.) and the temperature (165.7° C.) at which the melting peak reached the baseline, a crystal-derived ring pattern could be confirmed though weak in its intensity. Therefore, it is considered that most of the crystals were melted at 160° C. as well, but that very few crystals remain.

The measurement results of DSC and CFT of other biodegradable polymers are shown in Table 11 below.

C., and the temperature at which the melting point peak reached the baseline was 204.4° C. It has been found that the DSC extrapolated melting offset temperature was higher than the CFT outflow onset temperature, and that the polymer could be partially melt extruded in a range of 193.6° C. or higher and lower than 198.4° C. FIG. 22 shows measurement results of CFT and DSC.

Example 35

Sample S21 (PGLA)

PGLA (Sample S21) available from BMG Corporation was analyzed by CFT and DSC. The CFT outflow onset temperature was 203.5° C., and the width of the crystal melting peak by DSC was approximately from 190 to 221° C. The crystal melting peak apex was 207.3° C., the DSC extrapolated melting offset temperature was 212.6° C., and the temperature at which the melting point peak reached the baseline was 220.8° C. It has been found that the DSC

TABLE 11

Partial melt spinning situation and heating state change behavior of other biodegradable polymers

| | Sample No. | Example Comparative Example | Composition | CFT outflow onset temperature [° C.] | Extrapolated melting offset temperature of DSC 1st heating peaks [° C.] | Baseline arrival temperature at DSC 1st heating peaks [° C.] | Whether partial melt extrusion is possible or not | Partially-melt extrudable temperature [° C.] |
|---|---|---|---|---|---|---|---|---|
| FIG. 21 | S19 | Comparative Example 14 | PGA | 233.9 | 232.7 | 240.0 | Not possible | — |
| FIG. 22 | S20 | Example 34 | PLLA | 193.6 | 198.4 | 204.4 | Possible | 193.6 to 198.4 |
| FIG. 23 | S21 | Example 35 | GA 88.5%, LA 11.5% | 203.5 | 212.6 | 220.8 | Possible | 203.5 to 212.6 |
| FIG. 24 | S22 | Example 36 | PPDO | 108.4 | 117.3 | 123.6 | Possible | 108.4 to 117.3 |
| FIG. 25 | S23 | Example 37 | PBS | 117.7 | 119.5 | 124.4 | Possible | 117.7 to 119.5 |
| FIG. 26 | S24 | Example 38 | PBSA | 87.3 | 94.5 | 98.4 | Possible | 87.3 to 94.5 |
| FIG. 27 | S25 | Comparative Example 15 | PCL | 69.3 | 63.7 | 70.4 | Not possible | — |

Comparative Example 14

Sample S19 (PGA)

Polyglycolic acid (PGA) (Sample S19) available from BMG Inc. was analyzed by a flow tester (CFT) and DSC. The CFT outflow onset temperature was 233.9° C., and the width of the crystal melting peak by DSC was approximately from 195 to 240° C. The crystal melting peak apex was 228.0° C., the DSC extrapolated melting offset temperature was 232.7° C., and the temperature at which the melting point peak reached the baseline was 240.0° C. It was found that the DSC extrapolated melting offset temperature was lower than the CFT outflow onset temperature, and that the polymer did not flow out unless in a completely melted state. FIG. 21 shows measurement results of CFT and DSC.

Example 34

Sample S20 (PLLA)

PLLA (Sample S20) having a Mw of 470000 available from BMG Corporation was analyzed by CFT and DSC. The CFT outflow onset temperature was 193.6° C., and the width of the crystal melting peak by DSC was approximately from 155 to 204° C. The crystal melting peak apex was 193.6° C., the DSC extrapolated melting offset temperature was 198.4° extrapolated melting offset temperature was higher than the CFT outflow onset temperature, and that the polymer could be partially melt extruded in a range of 203.5° C. or higher and lower than 212.6° C. FIG. 23 shows measurement results of CFT and DSC.

Example 36

Sample S22 (PPDO)

PPDO (Sample S22) available from BMG Corporation was analyzed by CFT and DSC. The CFT outflow onset temperature was 108.4° C., and the width of the crystal melting peak by DSC was approximately from 77 to 124° C. The crystal melting peak apexes were 104.2° C. and 113.1° C., the DSC extrapolated melting offset temperature was 117.3° C., and the temperature at which the melting point peak reached the baseline was 123.6° C. It has been found that the DSC extrapolated melting offset temperature was higher than the CFT outflow onset temperature, and that the polymer could be partially melt extruded in a range of 108.4° C. or higher and lower than 117.3° C. FIG. 24 shows measurement results of CFT and DSC.

Example 37

Sample S23 (PBS)

PBS (Sample S23) available from Mitsubishi Chemical Corporation was analyzed by CFT and DSC. The CFT outflow onset temperature was 117.7° C., and the width of the crystal melting peak by DSC was approximately from 80 to 124° C. The crystal melting peak apex was 115.0° C., the DSC extrapolated melting offset temperature was 119.5° C., and the temperature at which the melting point peak reached the baseline was 124.4° C. It has been found that the DSC extrapolated melting offset temperature was higher than the CFT outflow onset temperature, and that the polymer could be partially melt extruded in a range of 117.7° C. or higher and lower than 119.5° C. FIG. 25 shows measurement results of CFT and DSC.

Example 38

Sample S24 (PBSA)

PBSA (Sample S24) available from Mitsubishi Chemical Corporation was analyzed by CFT and DSC. The CFT outflow onset temperature was 87.3° C., and the width of the crystal melting peak by DSC was approximately from 55 to 98° C. The crystal melting peak apex was 90.1° C., the DSC extrapolated melting offset temperature was 94.5° C., and the temperature at which the melting point peak reached the baseline was 98.4° C. It has been found that the DSC extrapolated melting offset temperature was higher than the CFT outflow onset temperature, and that the polymer could be partially melt extruded in a range of 87.3° C. or higher and lower than 94.5° C. FIG. 26 shows measurement results of CFT and DSC.

Comparative Example 15

Sample S25 (PCL)

Polycaprolactone (PCL) (Sample S25) available from Ingevity Corporation was analyzed by a flow tester (CFT) and DSC. The CFT outflow onset temperature was 69.3° C., and the width of the crystal melting peak by DSC was approximately from 35 to 70° C. The crystal melting peak apex was 59.3° C., the DSC extrapolated melting offset temperature was 63.7° C., and the temperature at which the melting point peak reached the baseline was 70.4° C. It was found that the DSC extrapolated melting offset temperature was lower than the CFT outflow onset temperature, and that the polymer did not flow out unless in a completely melted state. FIG. 27 shows measurement results of CFT and DSC.

The invention claimed is:

1. A method for producing a polymeric molded product, the method comprising:

melt-molding a polymer comprising lamellar crystals that are different in lamella thickness, in a temperature range where some of the lamellar crystals undergo melting and flowing, and the other balance lamellar crystals remain unmelted, wherein the temperature range is from 113.9° C. to 140.9° C., which is higher than an outflow onset temperature determined in accordance with a flow tester temperature raising method and lower than an extrapolated melting offset temperature, and wherein a residual ratio of a molecular weight of the polymer after melt-molding is more than 86%, and wherein the polymer is a copolymer comprising 3-hydroxybutyric acid and 4-hydroxybutyric acid as monomer units, and a proportion of the 4-hydroxybutyric acid is from 5 mol % to 40 mol %, and a weight average molecular weight of the polymer is 500.000 or greater.

2. The method according to claim 1, further comprising:

cooling the melted polymer in air, in a temperature range where some of the lamellar crystals undergo melting and flowing, and the other balance lamellar crystals remain unmelted.

3. The method according to claim 1, wherein the melt-molding is molding through melt extrusion.

4. The method according to claim 1, wherein the melt-molding is molding through melt extrusion spinning.

5. The method according to claim 1, wherein the melt-molding is performed once.

6. The method according to claim 1, wherein the residual ratio of the molecular weight of the polymer after melt-molding is at least 93%.

* * * * *